United States Patent
Hamasaki et al.

(10) Patent No.: US 7,102,837 B2
(45) Date of Patent: Sep. 5, 2006

(54) ONE-WAY ROTATIONAL TRANSFER MECHANISM, AND A LENS BARREL INCORPORATING THE SAME

(75) Inventors: Takuji Hamasaki, Saitama (JP); Makoto Iikawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 91 days.

(21) Appl. No.: 11/000,267

(22) Filed: Dec. 1, 2004

(65) Prior Publication Data
US 2005/0115358 A1 Jun. 2, 2005

(30) Foreign Application Priority Data
Dec. 2, 2003 (JP) .............................. 2003-402830
Dec. 25, 2003 (JP) .............................. 2003-431042

(51) Int. Cl.
G02B 7/02 (2006.01)
G02B 15/14 (2006.01)
F16D 15/00 (2006.01)
F16D 11/06 (2006.01)
G03G 15/22 (2006.01)

(52) U.S. Cl. .................. 359/823; 192/38; 192/44; 359/703; 396/144

(58) Field of Classification Search .................. 192/38, 192/44, 45; 359/694, 696, 697, 698, 703, 359/823; 396/144
See application file for complete search history.

(56) References Cited

U.S. PATENT DOCUMENTS 5,052,781 A    10/1991    Iizuka
5,701,208 A    12/1997    Sato et al.
5,915,514 A     6/1999    Nojiri et al.
6,827,190 B1   12/2004    Hamasaki

FOREIGN PATENT DOCUMENTS

| JP | 2-253210   | 10/1990 |
| JP | 02-253214  | 10/1990 |
| JP | 08-177878  | 7/1996  |
| JP | 11-023939  | 1/1999  |
| JP | 11-202181  | 7/1999  |

OTHER PUBLICATIONS

U.S. Appl. No. 10/958,219, filed Oct. 5, 2004.
U.S. Appl. No. 10/971,118, filed Oct. 25, 2004.

*Primary Examiner*—David N. Spector
(74) *Attorney, Agent, or Firm*—Greenblum & Bernstein, P.L.C.

(57) ABSTRACT

A one-way rotational transfer mechanism includes a rotary input shaft, a rotary output shaft, a clutch member, a differential rotating member, a circumferentially-uneven-width-space forming portion formed on the rotary input shaft, a torque transfer member, and an associating device. The torque transfer member wedges between the circumferentially-uneven-width-space forming portion and the clutch member while making the torque transfer member contact the clutch so that the rotary input shaft and the clutch member become integral upon rotation of the rotary input shaft. The associating device causes the clutch member to transfer torque thereof to the rotary output shaft, and the clutch member to release engagement of the rotary input shaft with the clutch member when the rotary output shaft is rotated so that a relative rotational torque greater than a predetermined torque determined by a shape of the associating device.

49 Claims, 8 Drawing Sheets

ONE-WAY ROTATIONAL TRANSFER MECHANISM, AND A LENS BARREL INCORPORATING THE SAME

BACKGROUND OF THE INVENTION

1. Field of the Invention

The present invention relates to a one-way rotational transfer mechanism having a rotary input shaft and a rotary output shaft which are concentrically arranged, wherein rotation of the rotary input shaft is transferred to the rotary output shaft when the rotary input shaft is rotated, but rotation of the rotary output shaft is not transferred to the rotary input shaft when the rotary output shaft is rotated. The present invention further relates to a lens barrel which incorporates such an one-way rotational transfer.

2. Description of the Related Art

Among conventional one-way rotational transfer mechanisms having a rotary input shaft and a hollow-cylindrical rotary output shaft positioned radially outside the rotary input shaft, wherein the rotary input shaft is driven by motor to transfer rotation of the rotary input shaft to the hollow-cylindrical rotary output shaft, a one-way rotational transfer mechanism which prevents the motor from being rotated by rotation of the rotary output shaft (i.e., prevents the rotary input shaft from being rotated by rotation of the rotary output shaft) when the rotary output shaft is rotated has been proposed in, e.g., Japanese laid-open patent publication H08-177878 and Japanese laid-open patent publication H11-202181.

Among conventional lens barrels available for both autofocus (AF) and manual focus (MF), a lens barrel including a stationary ring, a movable ring, a distance adjustment ring, and an AF motor and a manual focus ring is known in the art, wherein the movable ring is concentrically arranged with the stationary ring, supports a focusing lens group and is movable forward and rearward along an optical axis, the distance adjustment ring is concentrically arranged with the stationary ring and rotates on an axis of the distance adjustment ring to move the movable ring forward and rearward along the optical axis, the AF motor drives the distance adjustment ring, and the manual focus ring is manually rotated about its axis to rotate the distance adjustment ring.

Furthermore, among the aforementioned conventional lens barrels usable for both autofocus (AF) and manual focus (MF), a lens barrel which incorporates a one-way rotational transfer mechanism between the distance adjustment ring and an AF motor, wherein a torque of the distance adjustment ring rotated by a rotation of the manual focus ring is not transferred to the AF motor when the manual focus ring is manually rotated even though a driving force of the AF motor is transferred to the distance adjustment ring when the AF motor is driven, is known in the art.

This type of lens barrel is disclosed in e.g., the aforementioned Japanese laid-open patent publication H08-177878. In this type of lens barrel, a manual focusing operation can be carried out even in AF mode with an AF switch remained ON.

However, in the lens barrel disclosed in Japanese laid-open patent publication H8-177878, a driving force of the AF motor is not smoothly transferred to the distance adjustment ring when the AF motor is driven because of heavy backlash which occurs upon rotation of the rotary input shaft (upon startup of the motor). Moreover, the torque transferred to the distance adjustment ring becomes small when driven at a slow rotational speed because the torque transferred to the distance adjustment ring is proportional to the rotational speed of the rotary input shaft.

In the one-way rotational transfer mechanism disclosed in the aforementioned Japanese patent publication H11-202181, the structure thereof is complicated. Moreover, it is difficult to increase the number of rollers serving as torque transfer members due to the complicated structure of the one-way rotational transfer mechanism, and accordingly, the torque which is transferred from the rotary input shaft to the hollow-cylindrical rotary output shaft when the rotary input shaft is driven to rotate cannot be increased very much.

Furthermore, in the lens barrel disclosed aforementioned Japanese laid-open patent publication H08-177878, there is a possibility of the one-way rotational transfer mechanism becoming incapable of securely transferring torque from the AF motor to the distance adjustment ring to thereby make it impossible to perform an autofocusing operation when the AF motor is driven.

SUMMARY OF THE INVENTION

The present invention provides a one-way rotational transfer mechanism which is simple in structure, capable of transferring a torque from the rotary input shaft to the rotary output shaft smoothly and reliably, capable of transferring a greater torque from the rotary input shaft to the rotary output shaft, and capable of making the rotary output shaft rotate smoothly upon a torque being applied thereto after the rotary output shaft is rotated upon application of a torque to the rotary output shaft.

The present invention further provides a lens barrel in which a movable lens group is moved selectively by a driving force of a motor or a torque of a hand-operated ring, wherein the driving force of the motor is securely transferred to the movable lens group to move the movable lens group when the motor is driven to rotate, and further wherein the movable lens group can be moved smoothly by a driving force of the hand-operated ring after the movable lens group is moved by a driving force of the motor.

According to an aspect of the present invention, a one-way rotational transfer mechanism is provided, including a rotary input shaft having an orthogonal surface lying on a plane orthogonal to an axis of the rotary input shaft; a rotary output shaft freely rotatable relative to the rotary input shaft about the axis thereof; a clutch member concentrically positioned around the rotary output shaft, the clutch member capable of moving along the axis of the rotary input shaft relative to the rotary output shaft, an inner peripheral surface of the clutch member serving as an inner-peripheral contacting surface; at least one differential rotating member positioned on a circle centered on the axis of the rotary input shaft, the differential rotating member revolving about the axis of the rotary input shaft in a same direction as a rotation of the rotary input shaft at a slower speed than the rotation of the rotary input shaft in association with the rotation of the rotary input shaft; a first biasing device which presses the differential rotating member against the orthogonal surface; a circumferentially-uneven-width-space forming portion formed on an outer peripheral surface of the rotary input shaft to form at least one accommodation space between the outer peripheral surface of the rotary input shaft and the inner-peripheral contacting surface of the clutch member, the accommodation space having different radial widths at different circumferential positions; at least one torque transfer member installed in the accommodation space to be freely movable therein and revolving about the axis of the rotary input shaft in a same direction as the differential rotating member in association with the differential rotating member, the torque transfer member having a circular cross-section contacting surface capable of contacting with the inner-peripheral contacting surface of the clutch member; a second biasing device which biases the clutch member in a direction to increase friction between the inner-peripheral contacting surface of the clutch member and the circular cross-section contacting surface of the torque transfer member to prevent the clutch member from moving relative to the rotary output shaft; and an associating device for transferring a torque produced by one of the clutch member and the rotary output shaft to the other of the clutch member and the rotary output shaft. The circumferentially-uneven-width-space forming portion is shaped to make the torque transfer member, which revolves about the axis of the rotary input shaft in association with the rotary input shaft and the differential rotating member, wedge between the circumferentially-uneven-width-space forming portion and the clutch member while making the circular cross-section contacting surface of the torque transfer member contact the inner-peripheral contacting surface so that the rotary input shaft and the clutch member become integral with each other circumferentially when the rotary input shaft is rotated. The associating device operates to make the clutch member, which becomes integral with the rotary input shaft, circumferentially transfer a torque of the clutch member to the rotary output shaft when the rotary input shaft is rotated, and operates to cause friction-decreasing relative movement between the clutch member and the rotary output shaft in a direction to decrease the friction against a biasing force of the second biasing device to release the state of integral engagement of the rotary input shaft with the clutch member when the rotary output shaft is rotated so that a relative rotational torque, which is defined as a difference between a rotational torque of the rotary output shaft and a rotational torque of the rotary input shaft, is greater than a predetermined torque determined by a shape of the associating device.

It is desirable for the associating device to prevent the friction-decreasing relative movement between the clutch member and the rotary output shaft when the relative rotational torque, upon the rotary input shaft being rotated, is smaller than or equal to the predetermined torque. When the relative rotational torque becomes larger than the predetermined torque, the associating device temporarily allows the friction-decreasing relative movement between the clutch member and the rotary output shaft, and subsequently allows the clutch member to return to an initial position thereof by the biasing force of the second biasing device to hold the clutch member at the initial position thereof.

In the case where the relative rotational torque is smaller than or equal to the predetermined torque, upon the rotary output shaft being rotated, it is desirable for the associating device not to allow the friction-decreasing relative movement between the clutch member and the rotary output shaft.

It is desirable for an annular space including the accommodation space to be formed between the rotary input shaft and the clutch member. The one-way rotational transfer mechanism further includes a retainer having a ring shape which is installed in the annular space to hold the torque transfer member, the retainer rotating in a same direction as the revolving direction of the differential rotating member upon receiving a revolving force of the differential rotating member when the differential rotating member revolves about the axis of the rotary input shaft.

The one-way rotational transfer mechanism can include a pressing member having a pressing surface which faces the orthogonal surface of the rotary input shaft to be parallel thereto. The pressing member is biased toward the orthogonal surface by the first biasing device to hold the differential rotating member between the pressing surface and the orthogonal surface.

It is desirable for the associating device to include at least one power transmission pin formed on one of the clutch member and the rotary input shaft, and at least one power transmission hole formed on the other of the clutch member and the rotary input shaft so that the power transmission pin is loosely fitted in the power transmission hole.

It is desirable for the predetermined torque to be determined by a shape of the power transmission hole and by a shape of the power transmission pin.

It is desirable for the inner-peripheral contacting surface of the clutch member to be formed as a first tapered surface, and for the circular cross-section contacting surface to be formed as a second tapered surface which tapers in a substantially same direction as the first tapered surface.

It is desirable for the torque transfer member to be formed in a truncated conical shape.

It is desirable for the differential rotating member to be formed as a substantially cylindrical-shaped roller an axis of which extends in a radial direction of the rotary input shaft.

It is desirable for the differential rotating member is spherical in shape.

It is desirable for the accommodation space formed by the circumferentially-uneven-width-space forming portion to include a plurality of accommodation spaces between the outer peripheral surface of the rotary input shaft and the inner-peripheral contacting surface of the clutch member, and for the torque transfer member to include a plurality of torque transfer members which are installed in the plurality of accommodation spaces, respectively.

It is desirable for the circumferentially-uneven-width-space forming portion to include at least one circumferentially-uneven-depth groove which is elongated in a longitudinal direction of the rotary input shaft and which has different radial depths at different circumferential positions.

It is desirable for the rotary input shaft to include an input gear which is in mesh with a pinion of a motor.

It is desirable for the rotary input shaft, the rotary output shaft and the clutch member to be concentrically positioned with one another.

It is desirable for the differential rotating member to include a plurality of differential rotating members, and for the retainer to include a plurality of engaging holes in which the plurality of differential rotating members are installed.

It is desirable for the torque transfer member to include a plurality of torque transfer members, and for the retainer to include a plurality of insertion holes in which the plurality of torque transfer members are installed, respectively.

The first biasing device can be a compression coil spring.

The second biasing device can be a compression coil spring.

It is desirable for the power transmission hole to include two power transmission holes arranged at intervals of 180 degrees in a circumferential direction of the one of the clutch member and the rotary input shaft, and for the power transmission pin to include two power transmission pins which are loosely fitted in the two power transmission holes, respectively.

According to another aspect of the present invention, a lens barrel is provided, including a hand-operated ring which moves a movable lens group along an optical axis thereof when manually rotated; a motor for moving the movable lens group along the optical axis; and a first one-way rotational transfer mechanism which transfers torque of the motor to the movable lens group when the motor is driven, and prevents a moving force of the movable lens group from being transferred to the motor when the hand-operated ring is manually rotated. The first one-way rotational transfer mechanism includes a rotary input shaft driven to rotate by the motor, the rotary input shaft including a first orthogonal surface lying on a plane orthogonal to an axis of the rotary input shaft which is parallel to the optical axis; a rotary output shaft freely rotatable relative to the rotary input shaft, wherein rotation of the rotary output shaft and a movement of the movable lens group along the optical axis are associated with each other; a clutch member concentrically positioned around the rotary output shaft, the clutch member capable of moving along the axis of the rotary input shaft relative to the rotary output shaft, an inner peripheral surface of the clutch member serving as an inner-peripheral contacting surface; at least one first differential rotating member positioned on a circle centered on the axis of the rotary input shaft, the differential rotating member revolving about the axis of the rotary input shaft in a same direction as a rotation of the rotary input shaft at a slower speed than the rotation of the rotary input shaft in association with the rotation of the rotary input shaft; a first biasing device which presses the first differential rotating member against the first orthogonal surface; a first circumferentially-uneven-width-space forming portion formed on an outer peripheral surface of the rotary input shaft to form at least one first accommodation space between the outer peripheral surface of the rotary input shaft and the inner-peripheral contacting surface of the clutch member, the first accommodation space having different radial widths at different circumferential positions; at least one first torque transfer member installed in the first accommodation space to be freely movable therein, the first torque transfer member revolving about the axis of the rotary input shaft in a same direction as a rotational direction of the first differential rotating member in association with the first differential rotating member, and having a circular cross-section contacting surface capable of contacting the inner-peripheral contacting surface of the clutch member; a second biasing device which biases the clutch member in a direction to increase friction between the inner-peripheral contacting surface of the clutch member and the circular cross-section contacting surface of the first torque transfer member to prevent the clutch member from moving relative to the rotary output shaft; and an associating device for transferring a torque produced by one of the clutch member and the rotary output shaft to the other of the clutch member and the rotary output shaft. The first circumferentially-uneven-width-space forming portion is shaped to make the first torque transfer member, which revolves about the axis of the rotary input shaft in association with the rotary input shaft and the first differential rotating member, wedge between the first circumferentially-uneven-width-space forming portion and the clutch member while making the circular cross-section contacting surface of the torque transfer member contact the inner-peripheral contacting surface so that the rotary input shaft and the clutch member become integral with each other circumferentially when the rotary input shaft is rotated. The associating device operates to make the clutch member, which becomes integral with the rotary input shaft, circumferentially transfer a torque of the clutch member to the rotary output shaft when the rotary input shaft is rotated, and operates to cause friction-decreasing relative movement between the clutch member and the rotary output shaft in a direction to decrease the friction against a biasing force of the second biasing device to release the state of integral engagement of the rotary input shaft with the clutch member when the rotary output shaft is rotated so that a relative rotational torque, which is defined as a difference between a rotational torque of the rotary output shaft and a rotational torque of the rotary input shaft, is greater than a predetermined torque determined by a shape of the associating device.

It is desirable for the associating device to prevent the friction-decreasing relative movement between the clutch member and the rotary output shaft when the relative rotational torque, upon the rotary input shaft being rotated, is smaller than or equal to the predetermined torque. When the relative rotational torque becomes larger than the predetermined torque, the associating device temporarily allows the friction-decreasing relative movement between the clutch member and the rotary output shaft, and subsequently allows the clutch member to return to an initial position thereof by the biasing force of the second biasing device to hold the clutch member at the initial position thereof.

In the case where the relative rotational torque is smaller than or equal to the predetermined torque, upon the rotary output shaft being rotated, it is desirable for the associating device not to allow the friction-decreasing relative movement between the clutch member and the rotary output shaft.

It is desirable for an annular space including the first accommodation space to be formed between the rotary input shaft and the clutch member. The one-way rotational transfer mechanism can include a retainer having a ring shape which is installed in the first annular space to hold the first torque transfer member, the retainer rotating in a same direction as a rotational direction of the first differential rotating member upon receiving a revolving force of the first differential rotating member when the first differential rotating member revolves about the axis of the rotary input shaft.

The lens barrel can include a first pressing member having a pressing surface which faces the first orthogonal surface of the rotary input shaft to be parallel thereto. The first pressing member is biased toward the first orthogonal surface by the first biasing device to hold the first differential rotating member between the first pressing surface and the first orthogonal surface.

It is desirable for the associating device to include at least one power transmission pin formed on one of the clutch member and the rotary input shaft; and at least one power transmission hole formed on the other of the clutch member and the rotary input shaft so that the power transmission pin is loosely fitted in the power transmission hole.

It is desirable for the predetermined torque to be determined by a shape of the power transmission hole and by a shape of the power transmission pin.

It is desirable for the inner-peripheral contacting surface of the clutch member to be formed as a first tapered surface. The circular cross-section contacting surface can be formed as a second tapered surface which tapers in a substantially same direction as the first tapered surface.

It is desirable for the torque transfer member to be formed in a truncated conical shape.

It is desirable for the first differential rotating member to be formed as a substantially cylindrical-shaped roller, an axis of which extends in a radial direction of the rotary input shaft.

It is desirable for the first differential rotating member to be spherical in shape.

It is desirable for the first accommodation space formed by the first circumferentially-uneven-width-space forming portion to include a plurality of first accommodation spaces between the outer peripheral surface of the rotary input shaft and the inner-peripheral contacting surface of the clutch member, and for the first torque transfer member to include a plurality of first torque transfer members which are installed in the plurality of first accommodation spaces, respectively.

It is desirable for the first circumferentially-uneven-width-space forming portion to include at least one first circumferentially-uneven-depth groove which is elongated in a longitudinal direction of the rotary input shaft and which has different radial depths at different circumferential positions.

The lens barrel can include a distance adjustment ring which moves the movable lens group along the optical axis by one of a torque of the hand-operated ring and a torque of the rotary output shaft; and a second one-way rotational transfer mechanism which transfers the torque of the hand-operated ring to the distance adjustment ring, and prevents the torque of the distance adjustment ring from being transferred to the hand-operated ring, the second one-way rotational transfer mechanism being positioned between the distance adjustment ring and the hand-operated ring.

The second one-way rotational transfer mechanism can include a second orthogonal surface formed on the hand-operated ring to lie in a plane orthogonal to the optical axis; an annular overlapping portion formed on the hand-operated ring to overlap the distance adjustment ring in a radial direction of the lens barrel; a torque transfer cylindrical surface formed on one of an inner peripheral surface and an outer peripheral surface of the distance adjustment ring to face the annular overlapping portion; at least one second circumferentially-uneven-width-space forming portion formed on the annular overlapping portion to form at least one second accommodation space between the annular overlapping portion and the torque transfer cylindrical surface, the second accommodation space having different radial widths at different circumferential positions; a second differential rotating member installed in the second accommodation space, and pressed against the second orthogonal surface by a third biasing device, the second differential rotating member revolving about the axis of the hand-operated ring in a same direction as a rotational direction of the hand-operated ring while revolving at a slower speed than the rotation of the hand-operated ring in association with the rotation of the hand-operated ring; and at least one second torque transfer member installed in the second accommodation space, the second torque member revolving about the axis of the hand-operated ring in a same revolving direction as the second differential rotating member when pressed by the second differential rotating member. The second circumferentially-uneven-width-space forming portion is shaped so that the second torque transfer member, which revolves in a circumferential direction about the axis of the hand-operated ring, wedges between the second circumferentially-uneven-width-space forming portion and the torque transfer cylindrical surface to transfer the torque of the hand-operated ring to the distance adjustment ring when the hand-operated ring is manually rotated.

It is desirable for the second torque transfer member to include a pair of second torque transfer members which are provided on opposite sides of the second differential rotating member in the circumferential direction in a manner so as to support the second differential rotating member.

It is desirable for at least a portion of the second circumferentially-uneven-width-space forming portion to be formed by at least one second circumferentially-uneven-depth groove having different radial depths at different circumferential positions.

The lens barrel can include a second pressing member having a second pressing surface which faces the second orthogonal surface to be parallel thereto, wherein the second pressing member is biased toward the second orthogonal surface by the third biasing device to hold the second differential rotating member between the second pressing surface and the second orthogonal surface.

The second accommodation space can include a plurality of second accommodation spaces formed between the annular overlapping portion and the torque transfer cylindrical surface. The second differential rotating member and the second torque transfer member are installed in each of the plurality of second accommodation spaces.

It is desirable for the second torque transfer member to be formed as a cylindrical member having an axis which is parallel to the axis of the hand-operated ring.

It is desirable for the movable lens group to serve as a focusing lens group, the motor to serve as an AF motor which moves the movable lens group along the optical axis to perform a focusing operation, and the hand-operated ring to serve as a manual focus ring which is manually rotated to perform the focusing operation.

The movable lens group can include an element of a zooming optical system of the lens barrel, the motor can serve as a zoom motor which moves the movable lens group along the optical axis to perform the zooming operation, and the hand-operated ring can serve as a zoom ring which is manually rotated to perform the zooming operation.

The rotary input shaft can include an input gear which is in mesh with a pinion of a motor.

It is desirable for the rotary input shaft, the rotary output shaft and the clutch member to be concentrically positioned with one another.

It is desirable for the second differential rotating member to include a plurality of second differential rotating members, and for the retainer to include a plurality of engaging holes in which the plurality of second differential rotating members are installed.

It is desirable for the first torque transfer member to include a plurality of torque transfer members, and for the retainer to include a plurality of insertions holes in which the plurality of first torque transfer members are installed, respectively.

The first biasing device can be a compression coil spring.

The second biasing device can be a compression coil spring.

The third biasing device can be an annular leaf spring.

The present disclosure relates to subject matter contained in Japanese Patent Applications No. 2003-402830 (filed on Dec. 2, 2003) and No. 2003-431042 (filed on Dec. 25, 2003) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 7 show a first embodiment of a lens barrel which is can be switched between an autofocus (AF) mode and a manual focus (MF) mode for an autofocus camera.

Firstly, the overall structure of this embodiment of the lens barrel 100 will be discussed hereinafter.

Figure 1:
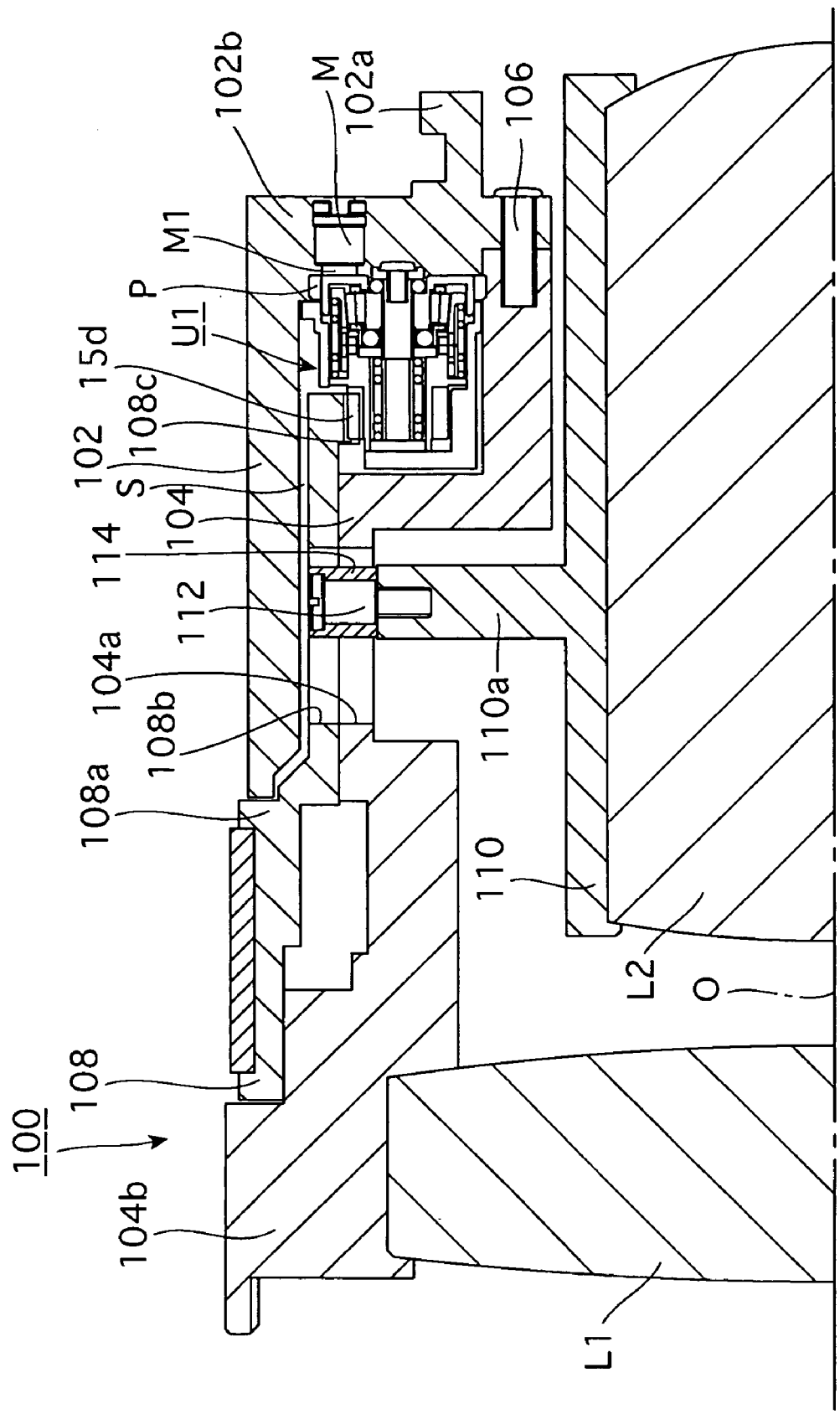
FIG. 1 is a longitudinal cross sectional view of an upper half of a first embodiment of a lens barrel from the optical axis thereof, according to the present invention.

In the following descriptions, the front and rear of the lens barrel 100 correspond to the left and right sides of the lens barrel 100 as viewed in FIG. 1, respectively. The lens barrel 100 is provided with a first stationary ring 102 having a mount portion (bayonet mount portion) 102a at a rear end of the first stationary ring 102. The mount portion 102a is mounted to a body mount provided on a camera body (not shown) via a bayonet engagement when the lens barrel 100 is attached to the camera body. The lens barrel 100 is provided inside the first stationary ring 102 with a second stationary ring 104, the rear end of which is fixed to the rear end of the first stationary ring 102 by set screws 106 (only one of them is shown in FIG. 1). A stationary lens group L1 is positioned in the second stationary ring 104 to be held by an inner peripheral surface of a front end portion of the second stationary ring 104. The second stationary ring 104 is greater in length than the first stationary ring 102 in the optical axis direction. The second stationary ring 104 is provided, at equi-angular intervals in a circumferential direction of the second stationary ring 104, with a set of three linear guide slots 104a extending in the optical axis direction (i.e., in a direction of an optical axis O of the lens barrel 100). The lens barrel 100 is provided between the first stationary ring 102 and the second stationary ring 104 with an accommodation space S which has an annular shape as viewed from the front thereof. The lens barrel 100 is provided in the accommodation space S with a manual focus ring (hand-operated ring) 108 which is concentrically positioned with the first stationary ring 102 to be freely rotatable about the optical axis O. A rotatable operating portion 108a serving as a front end portion of the manual focus ring 108 is positioned in an annular space formed between a front end portion of the first stationary ring 102 and a front end portion 104b of the second stationary ring 104. The manual focus ring 108 is provided with a set of cam grooves 108b (only one of them is shown in FIG. 1) which extend obliquely to the set of three linear guide slots 104a. The manual focus ring 108 is provided, circumferentially on the inner peripheral surface of a rear end of the manual focus ring 108, with an input gear 108c.

The lens barrel 100 is provided radially inside the second stationary ring 104 with a movable ring 110 for holding a focusing lens group (movable lens group) L2. The movable ring 110 is concentrically positioned with the first stationary ring 102 to be freely movable along the optical axis O without rotating about the optical axis O. The movable ring 110 is provided on an outer peripheral surface thereof at equi-angular intervals in a circumferential direction with a set of three radial projections 110a. A roller 114 is fixed to an end surface of each radial projection 110a. Each roller 114 is engaged with both the associated linear guide slot 104a and the associated cam groove 108b, so that forward and reverse rotations of the manual focus ring 108 cause the movable ring 110 (the focusing lens group L2) to move forward and rearward in the optical axis direction along the set of three linear guide slots 104a, respectively.

An AF motor (motor) M is embedded in a rear wall 102b of the first stationary ring 102 so that a rotary shaft M1 and a pinion P of the motor M project forward to be positioned inside the accommodation space S. The lens barrel 100 is provided in the accommodation space S with a one-way rotational transfer mechanism (first one-way rotational transfer mechanism) U1 via which the pinion P and the input gear 108c of the manual focus ring 108 are associated with each other.

The structure of the one-way rotational transfer mechanism U1 will be hereinafter discussed in detail with reference mainly to FIGS. 2 and 7.

The one-way rotational transfer mechanism U1 is provided with a cylindrical housing 3 whose front and rear ends are formed as a closed end and an open end, respectively. The cylindrical housing 3 is provided at a rear end thereof with an annular flange 3a, which is fixed to the first stationary ring 102 by set screws (not shown). The cylindrical housing 3 is provided at a front end thereof with a front wall 3b, and a disc plate 3c is fixed to a rear surface of the front wall 3b at the center thereof. The one-way rotational transfer mechanism U1 is provided radially inside the housing 3 with a rotational shaft (stationary shaft) 5, which is positioned coaxially with the axis of the housing 3. A front surface of the rotational shaft 5 is fixed to a rear surface of the disc plate 3c. The rotational shaft 5 includes of a front small-diameter portion 5a and a rear large-diameter portion 5b. The axial direction of the rotational shaft 5 is parallel to the optical axis O.

Figure 4:
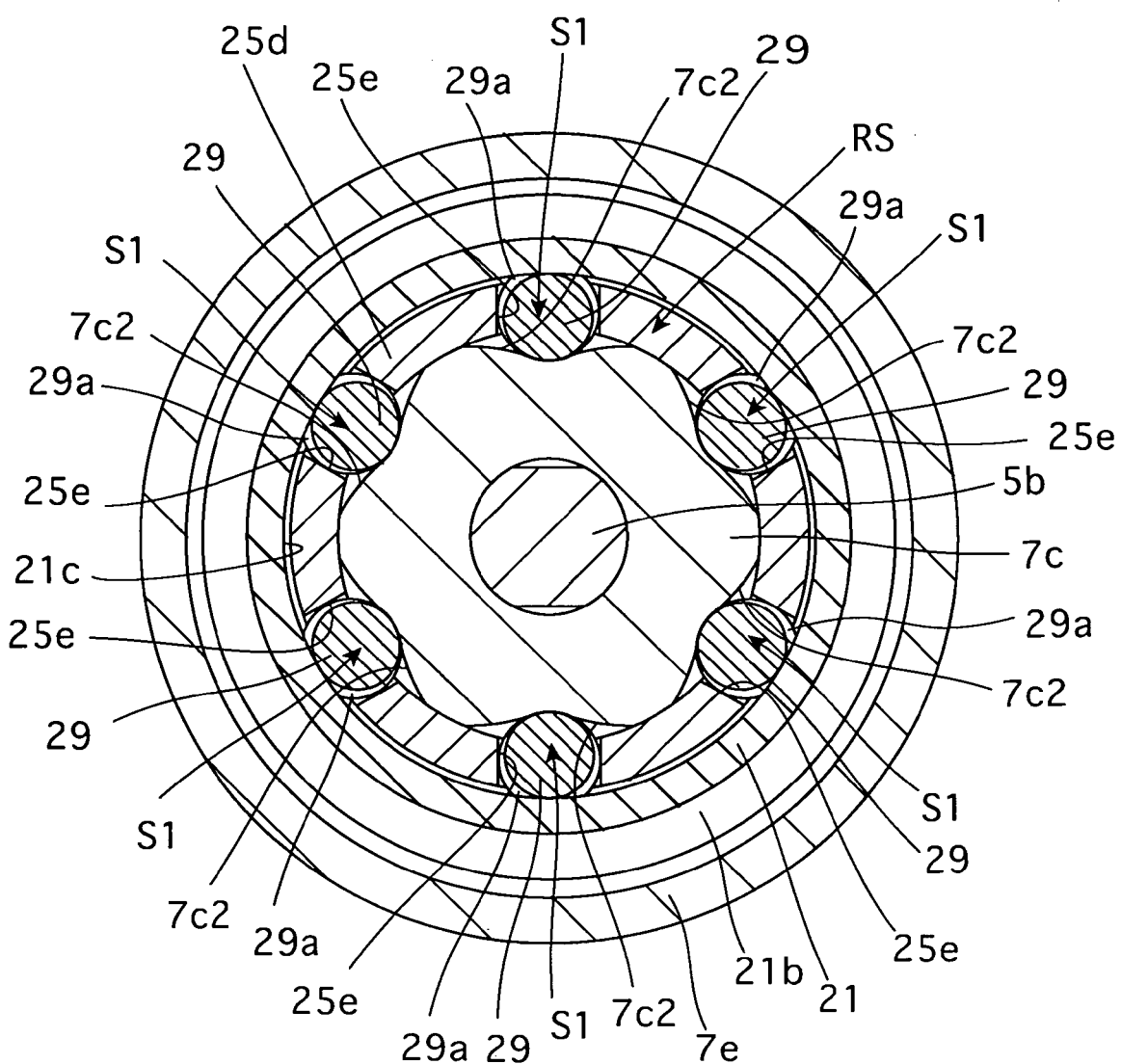
FIG. 4 is a cross sectional view taken along IV—IV line in FIG. 2, in which the housing, the rotary output shaft, the AF motor, the input gear of the rotary input shaft, and the compression coil spring are not shown.
Figure 5:
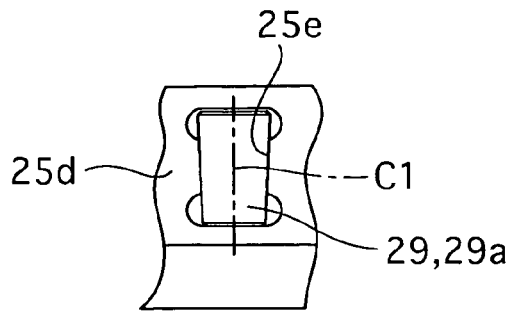
FIG. 5 is an enlarged plan view of a portion of a retainer and an engageable roller.

The one-way rotational transfer mechanism U1 is provided on the large-diameter portion 5b of the rotational shaft 5 with a hollow-cylindrical rotary input shaft 7 having a central hole 7a, in which the large-diameter portion 5b is fitted, so that the rotary input shaft 7 is freely rotatable on the large-diameter portion 5b. The rotary input shaft 7 is provided with an annular accommodation recess 7b, which is viewed as an annular shape from the front of the rotary input shaft 7 along the axial direction thereof. The rotary input shaft 7 is provided radially inside the annular accommodation recess 7b with a hollow-cylindrical small-diameter portion 7c having a central hole 7a so that a front surface of the small-diameter portion 7c is formed as an axially-orthogonal surface 7c1 (first orthogonal surface; viewed as an annular surface from the front of the rotary input shaft 7) which lies in a plane orthogonal to the optical axis O (to the rotational shaft 5). The rotary input shaft 7 is provided at a rear end thereof with a rear wall 7d which is viewed as an annular shape from the front of the rotary input shaft 7, and is further provided on the outer edge of the rear wall 7d with an outer cylindrical wall 7e (viewed as an annular shape from the front of the rotary input shaft 7), which projects forward from the outer edge of the rear wall 7d. The small-diameter portion 7c of the rotary input shaft 7 is provided, on an outer peripheral surface thereof at equiangular intervals in a circumferential direction of the rotary input shaft 7, with six circumferentially-uneven-depth grooves (first circumferentially-uneven-width-space forming portions/first circumferentially-uneven-depth grooves) 7c2, each of which has different radial depths at different circumferential positions as shown in FIG. 4. The rotary input shaft 7 is provided, on a radially inner end of a front surface of the rear end wall 7d, with an annular stepped portion 7f, and is further provided on an outer peripheral surface of the outer cylindrical wall 7e with an input gear 7g.

A front portion of the rotary input shaft 7 in front of the input gear 7g is accommodated in the housing 3. The rotary input shaft 7 is provided, on a rear end surface at the center thereof, with an annular recess 7h, while a plurality of steel balls 9 (like those of a ball bearing) are positioned circumferentially in the annular recess 7h. A stop ring 11 having a diameter substantially the same as the diameter of the annular recess 7h is fixed to the rear end surface of the rotational shaft 5 by a set screw 13, to prevent the rotary input shaft 7 from moving rearward beyond the position thereof shown in FIG. 7, by engagement of each steel ball 9 with the stop ring 11.

A reversible AF motor M is fixed to the annular flange 3a of the housing 3 so that the pinion P fixed on the rotary shaft M1 of the AF motor M is in mesh with the input gear 7g of the rotary input shaft 7.

The one-way rotational transfer mechanism U1 is provided inside the housing 3 with a hollow-cylindrical rotary output shaft 15 whose front and rear ends are each formed as an open end. The rotary output shaft 15 is provided at a front end and a rear end thereof with a small-diameter portion 15a and a large-diameter portion 15b, respectively. The rotational shaft 5 is loosely fitted in a central hole 15c of the hollow-cylindrical rotary output shaft 15. A front end portion of the small-diameter portion 15a is fitted on an outer peripheral surface of the disc plate 3c so that the small-diameter portion 15a is rotatable about the disc plate 3c. The small-diameter portion 15a is provided on its entire outer peripheral surface with an output gear 15d which is exposed to the outside of the housing 3 via an opening 3d formed on a front end portion of the housing 3. The output gear 15d is in mesh with the input gear 108c of the manual focus ring 108 (see FIG. 1).

The rotary output shaft 15 is provided on a rear end surface of the large-diameter portion 15b with an annular projection 15e which projects rearward, and is provided, on an outer peripheral surface of the large-diameter portion 15b in the vicinity of the front end thereof, with an annular flange 15f which projects radially outwards in a direction orthogonal to the axis of the rotational shaft 5.

An annular member (first pressing member) 17 is fitted on the rear large-diameter portion 5b of the rotational shaft 5 to be positioned in front of the rotary input shaft 7. A compression coil spring (first biasing device) 19 is installed in a compressed state between a front surface of the annular member 17 and a rear surface of the disc plate 3c. The annular member 17 is continuously biased rearward by the spring force of the compression coil spring 19. A rear surface of the annular member 17 serves as a flat pressing surface (first pressing surface) 17a, which is parallel to the axially-orthogonal surface 7c1 of the rotary input shaft 7.

The one-way rotational transfer mechanism U1 is provided between the axially-orthogonal surface 7c1 and the pressing surface 17a with an annular accommodation space CS which has an annular shape as viewed from the front of the one-way rotational transfer mechanism.

Figure 6:
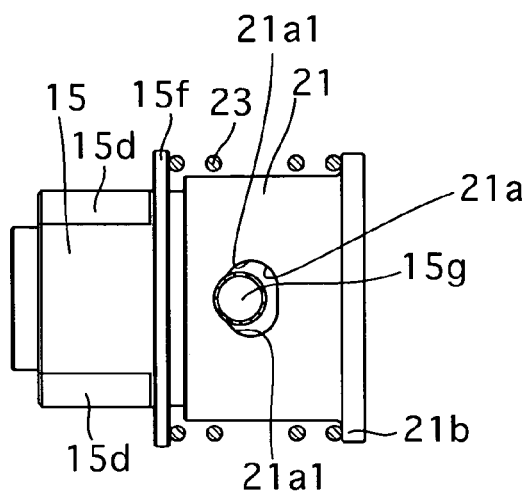
FIG. 6 is a side elevational view of a portion of the first one-way rotational transfer mechanism shown in FIGS. 1 and 2, showing a positional relationship between the rotary output shaft and a clutch upon a torque being applied to the rotary input shaft.

The one-way rotational transfer mechanism U1 is provided around the rotary output shaft 15 with a cylindrical clutch member 21 whose front and rear ends are each formed as an open end. The clutch member 21 is concentrically positioned with the rotary output shaft 15. As shown in FIGS. 6 and 7, the clutch member 21 is provided with two engaging holes (power transmission hole/associating device) 21a (only one engaging hole 21a is shown in each of FIGS. 6 and 7), which are arranged at intervals of 180 degrees in a circumferential direction of the clutch member 21. Each engaging hole 21a has an approximate triangular shape as shown in FIGS. 6 and 7. The rotary output shaft 15 is provided on an outer peripheral surface with two radial projections (power transmission pins/associating device) 15g (only one of which is shown in FIG. 1), which are loosely fitted into the two engaging holes 21a, so that the clutch member 21 is movable in forward and reverse directions and also in circumferential directions of the clutch member 21 relative to the rotary output shaft 15, in a range of movement corresponding to the amount of clearance between each engaging hole 21a and the associated radial projection 15g. The clutch member 21 is provided at a rear end thereof with an annular flange 21b which projects radially outwards, while a compression coil spring (second biasing device) 23 having a predetermined spring force is installed in a compressed fashion between the annular flange 21b of the clutch member 21 and the annular flange 15f of the rotary output shaft 15 to continuously bias the clutch member 21 rearwards. A rear end portion of an inner peripheral surface of the clutch member 21 is formed as an inner tapered surface 21c (inner-peripheral contacting surface/first tapered surface) which tapers in a direction toward the front of the cylindrical clutch member 21 (see FIG. 2) so that the diameter of the inner tapered surface 21c gradually decreases.

As shown in FIG. 4, an accommodation space (first circumferentially-uneven-width space) S1 having different radial widths at different circumferential positions is formed between the inner tapered surface 21c of the clutch member 21 and each of the six circumferentially-uneven-depth grooves 7c2.

Figure 2:
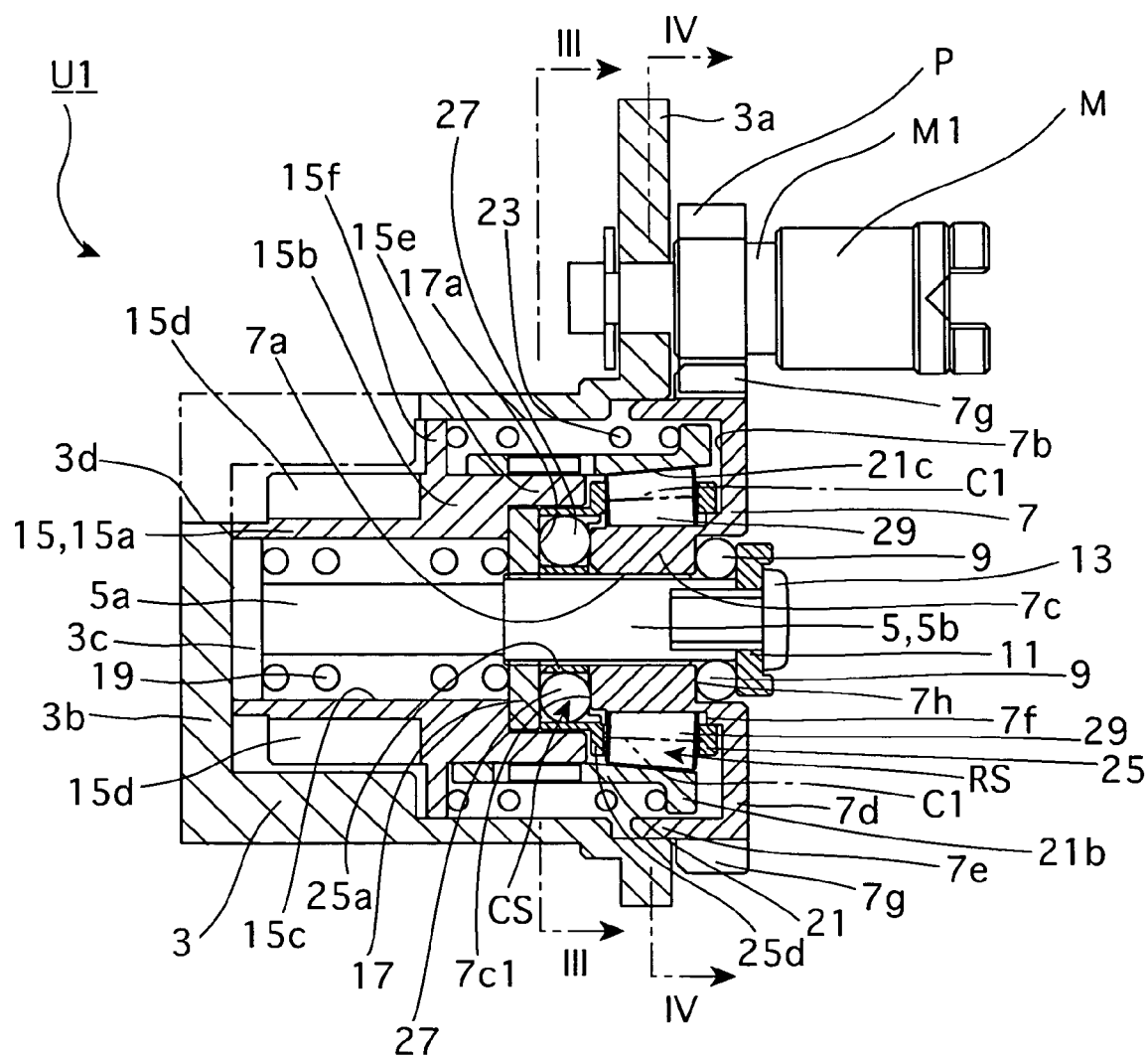
FIG. 2 is a longitudinal cross sectional view of a first one-way rotational transfer mechanism incorporated in the lens barrel shown in FIG. 1.
Figure 3:
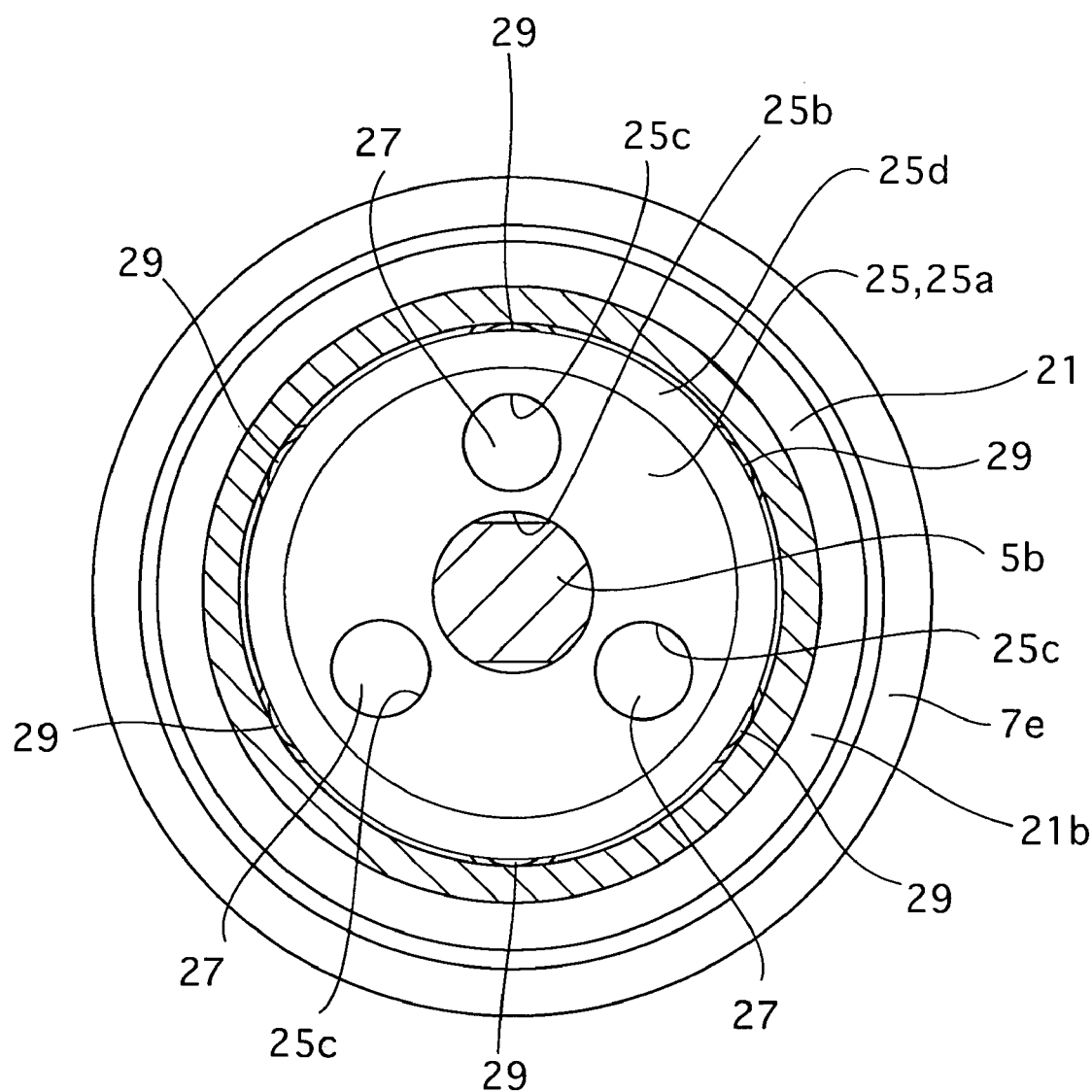
FIG. 3 is a cross sectional view taken along III—III line in FIG. 2, in which a housing, a rotary output shaft, an AF motor, an input gear of a rotary input shaft, and a compression coil spring are not shown.

As shown in FIG. 2, an annular space RS which has an annular shape, as viewed from the front of the one-way rotational transfer mechanism U1, is formed between the inner tapered surface 21c and the small-diameter portion 7c. The annular space RS is intercommunicatively connected with the annular accommodation space CS as shown in FIG. 2. The one-way rotational transfer mechanism U1 is provided across the annular space RS and the annular accommodation space CS therein with a cylindrical retainer 25 whose rear end is formed as an open end. The cylindrical retainer 25 is provided at a front end thereof with a circular front wall 25a having an insertion hole 25b (see FIG. 3) at the center of the front wall 25a. The large-diameter portion 5b of the rotational shaft 5 is fitted into the insertion hole 25b so that the retainer 25 can freely rotate on the rotational shaft 5. The rear end of the retainer 25 is fitted on the annular stepped portion 7f of the rotary input shaft 7 to be freely rotatable relative to the annular stepped portion 7f. As shown in FIG. 3, the front wall 25a of the retainer 25 is provided at equi-angular intervals in a circumferential direction of the retainer 25 with three engaging holes 25c, in which three differential balls (first differential rotating members) 27 (like those of a ball bearing) are engaged to be freely rotatable therein, respectively. Each differential ball 27 is positioned on a circle centered on the axis of the rotary input shaft 7. Each differential ball 27 projects forward from a front surface of the front wall 25a and projects rearward from a rear surface of the front wall 25a. Each different ball 27 contacts the axially-orthogonal surface 7c1 of the rotary input shaft 7 to be continuously held between the flat pressing surface 17a of the annular member 17 and the axially-orthogonal surface 7c1 because each differential ball 27 contacts the flat pressing surface 17a of the annular member 17, that is continuously biased rearward (toward the axially-orthogonal surface 7c1) by the compression coil spring 19.

The retainer 25 is provided, on a cylindrical portion 25d thereof at equi-angular intervals in a circumferential direction of the retainer 25, with six insertion holes 25e. An engageable roller (first torque transfer member) 29 having a truncated conical shape is installed in each insertion hole 25e with an axis (axis of rotation) C1 of the engageable roller 29 extending in a substantially forward/rearward direction of the one-way rotational transfer mechanism U1. Each engageable roller 29 is rotatable on the axis C1 thereof and linearly slightly movable along the axis C1 thereof. An outer peripheral surface of each engageable roller 29 is formed as an outer tapered surface (circular cross-section contacting surface/second tapered surface) 29a. As shown in FIG. 2, the outer tapered surface 29a and the inner tapered surface 21c are tapered in the same direction (i.e., in a direction toward the front of the cylindrical clutch member 21) by substantially the same angle. As shown in FIGS. 2 and 4, the outer tapered surface 29a partly contacts the associated circumferentially-uneven-depth groove 7c2 at all times.

The lens barrel 100 is provided with an AF switch (not shown) for enabling or disabling AF photography (i.e. for switching between AF mode and MF mode).

Operations of the lens barrel 100 having the above described structure will be discussed hereinafter.

Firstly, operations of the lens barrel 100 when a focusing operation is performed in autofocus mode will be hereinafter discussed.

The aforementioned AF switch is switched ON beforehand so that the lens barrel 100 can perform an autofocusing operation. Immediately after a control circuit (not shown) provided in the camera body outputs a forward-rotation drive signal to the AF motor M to rotate the AF motor M in a forward direction, a forward rotation of the AF motor M is transferred to the rotary input shaft 7 via the engagement of the pinion P with the input gear 7g, so that the rotary input shaft 7 rotates counterclockwise as viewed in FIGS. 3 and 4. Thereupon, each differential ball 27, which is held between the pressing surface 17a of the annular member 17 and the axially-orthogonal surface 7c1 of the rotary input shaft 7, revolves (rotates) about the axis of the rotary input shaft 7 in the same rotating direction as the rotary input, shaft 7 while rolling in the associated accommodation space S1. During this movement of each differential ball 27, provided that no slip occurs either between each differential ball 27 and the pressing surface 17a or between each differential ball 27 and the axially-orthogonal surface 7c1, the revolving speed of each differential ball 27 about the axis of the rotary input shaft 7 is half the rotational speed of the rotary input shaft 7. As a result, each differential ball 27 revolves clockwise relative to the rotary input shaft 7. Since the retainer 25 and each engageable roller 29 rotate together with each differential ball 27, each engageable roller 29 firmly wedges between that one of the radially-narrowed circumferentially opposite ends of the associated circumferentially-uneven-depth groove 7c2, which is positioned on the clockwise side in the associated accommodation space S1 and the inner tapered surface 21c of the clutch member 21, so that a strong wedging force (frictional force) occurs between the outer tapered surface 29a of each engageable roller 29 and the inner tapered surface 21c of the clutch member 21. This causes the small-diameter portion 7c (the rotary input shaft 7) and the clutch member 21 to become integral with each other circumferentially (i.e., in a state so as to rotate together) via the wedged engageable rollers 29, so that the rotation of the small-diameter portion 7c is transferred to the clutch member 21 to rotate the clutch member 21 counterclockwise.

At this time, the rotation of the clutch member 21 immediately causes the rotary output shaft 15 to rotate counterclockwise because each radial projection 15g remains engaged with a front end portion of the associated engaging hole 21a, which has the least circumferential width in a circumferential direction of the clutch member 21 as shown in FIG. 6. Thereupon, this rotation of the rotary output shaft 15 is transferred to the output gear 15d of the rotary output shaft 15, and the rotation of the output gear 15d is transferred to the input gear 108c of the manual focus ring 108 to rotate the manual focus ring 108 counterclockwise as viewed from the front thereof, thus causing the focusing lens group L2 to move forward along the optical axis O.

On the other hand, if the control circuit in the camera body outputs a reverse-rotation drive signal to the AF motor M to rotate the AF motor M in reverse direction, a reverse rotation of the AF motor M is transferred to the rotary input shaft 7 via the engagement of the pinion P with the input gear 7g, so that the rotary input shaft 7 rotates clockwise as viewed in FIGS. 3 and 4. Thereupon, each differential ball 27 revolves (rotates) about the axis of the rotary input shaft 7 in the same rotating direction as the rotary input shaft 7 while rolling in the associated accommodation space S1. During this movement of each differential ball 27, provided that no slip occurs either between each differential ball 27 and the pressing surface 17a or between each differential ball 27 and the axially-orthogonal surface 7c1, the revolving speed of each differential ball 27 about the axis of the rotary input shaft 7 is half the rotational speed of the rotary input shaft 7. As a result, each differential ball 27 revolves counterclockwise relative to the rotary input shaft 7. Since the retainer 25 and each engageable roller 29 rotate together with each differential ball 27, each engageable roller 29 firmly wedges between the other of the radially-narrowed circumferentially opposite ends of the associated circumferentially-uneven-depth groove 7c2, which is positioned on the counterclockwise side in the associated accommodation space S1 and the inner tapered surface 21c of the clutch member 21. This causes the small-diameter portion 7c (the rotary input shaft 7) and the clutch member 21 to become integral with each other circumferentially (i.e., in a state so as to rotate together) via the wedged engageable rollers 29, the retainer 25 and the three differential balls 27, so that the rotation of the small-diameter portion 7c is transferred to the clutch member 21 to rotate the clutch member 21 clockwise. At this time, similar to the above described case where the clutch member 21 is rotated counterclockwise by a counterclockwise rotation of the small-diameter portion 7c, the rotation of the clutch member 21 immediately causes the rotary output shaft 15 to rotate clockwise because each radial projection 15g remains engaged with a front end portion of the associated engaging hole 21a which has the least circumferential width in a circumferential direction of the clutch member 21 as shown in FIG. 6. Thereupon, this rotation of the rotary output shaft 15 is transferred to the output gear 15d of the rotary output shaft 15, while the rotation of the output gear 15d is transferred to the input gear 108c of the manual focus ring 108 to rotate the manual focus ring 108 clockwise as viewed from the front thereof, thus causing the focusing lens group L2 to move rearward along the optical axis O.

In this manner the control circuit makes the AF motor M rotate in forward and reverse directions to move the focusing lens group L2 forward and rearward to perform an autofocusing operation.

As described above, each engageable roller 29 firmly wedges between one of the radially-narrowed circumferentially opposite ends of the associated circumferentially-uneven-depth groove 7c2, which is positioned on the counterclockwise side, and the inner tapered surface 21c of the clutch member 21, so that a strong wedging force (frictional force) occurs therebetween, causing the small-diameter portion 7c (the rotary input shaft 7) and the clutch member 21 to become integral with each other circumferentially (i.e., in a state so as to rotate together) via the wedged engageable rollers 29, the retainer 25 and the three differential balls 27. Subsequently, the below-described AF operation is carried out.

If the control circuit in the camera body outputs a reverse-rotation drive signal to the AF motor M immediately before each engageable roller 29 wedges between the associated circumferentially-uneven-depth groove 7c2 and the inner tapered surface 21c of the clutch member 21, the rotary input shaft 7 rotates. At this time, if the relative rotational torque (which is smaller when the rotational direction of the rotary input shaft 7 is the same as that of the rotary output shaft 15, is larger when the rotary input shaft 7 and the rotary output shaft 15 rotate in mutually opposite directions, and is 0 (zero) if the rotary input shaft 7 and the rotary output shaft 15 receive the same rotational torque in the same rotational direction), which is determined by the difference between the rotational torque of the rotary input shaft 7 and the rotational torque of the rotary output shaft 15, is smaller than or equal to a predetermined torque (predetermined value) that is determined by the shape of the two radial projections 15g and the shape of the two engaging holes 21a (the shape of the association device), since the two radial projections 15g of the rotary output shaft 15 and the two engaging holes 21a of the clutch member 21 maintain the relationship shown in FIG. 6, the rotary output shaft 15 and the rotary input shaft 7 rotate together in the same direction, so that the focusing lens L2 moves along the optical axis direction.

Figure 7:
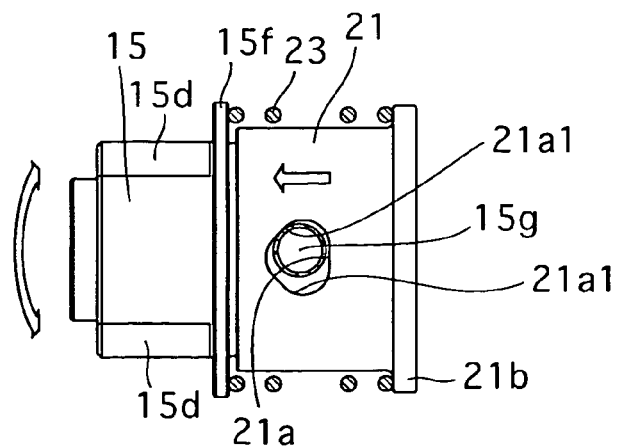
FIG. 7 is a side elevational view of a portion of the first one-way rotational transfer mechanism shown in FIGS. 1 and 2, showing another positional relationship between the rotary output shaft and the clutch upon a torque being applied to the rotary output shaft.

On the other hand, as in the case where the manual focus ring 108 is prevented from rotating by the user's hand, if the relative rotational torque becomes larger than the predetermined torque, the two radial projections 15g temporarily move rearward within the corresponding two engaging holes 21a along respective oblique edges (oblique surfaces) 21a1, and as shown in FIG. 7, since the clutch member 21 moves forward against the biasing force of the compression coil spring 23, the aforementioned wedging force which occurs between the outer tapered surface 29a of each engageable roller 29 and the inner tapered surface 21c of the clutch member 21 decreases. Accordingly, the transmission of rotational force from the rotary input shaft 7 to the clutch member 21 is temporarily interrupted, so that the rotary output shaft 15 does not rotate and only the rotary input shaft 7 rotates.

If the AF motor M continues to further rotate until a predetermined amount of time elapses, since the clutch 21 returns back to the initial position shown in FIG. 6 due to the biasing force of the compression coil spring 23, each engageable roller 29 again wedges in between one of the radially-narrowed circumferentially opposite ends of the associated circumferentially-uneven-depth groove 7c2 and the inner tapered surface 21c of the clutch member 21, so that a strong wedging force (frictional force) occurs therebetween. As a result, the small-diameter portion 7c (the rotary input shaft 7) and the clutch member 21 become integral with each other circumferentially (i.e., in a state so as to rotate together) via the wedged engageable rollers 29, the retainer 25 and the three differential balls 27.

Operations of the lens barrel 100 when a focusing operation is performed in a manual focus mode will be hereinafter discussed.

If the manual focus ring 108 is manually rotated in a forward or reverse direction with no actuation of the AF motor M, the movable ring 110 together with the focusing lens group L2 moves in a forward or reverse direction to perform a focusing operation (MF operation).

Upon such a rotation of the manual focus ring 108, the rotation of manual focus ring 108 is transferred to the output gear 15d of the rotary output shaft 15 to rotate the rotary output gear 15d clockwise or counterclockwise about the rotational shaft 5. Accordingly, the rotary input shaft 7 moves in the following manner described below in correspondence with the amount of relative rotational torque of the rotary output shaft 15 and the rotary input shaft 7 at this time.

Namely, as in the case where each engageable roller 29 is not wedged in between one of the radially-narrowed circumferentially opposite ends of the associated circumferentially-uneven-depth groove 7c2 and the inner tapered surface 21c of the clutch member 21 (or is only wedged by a low amount of force), if the relative rotational torque is smaller than or equal to the predetermined torque even if the rotary output shaft 15 is rotated, although each radial projection 15g of the rotary output shaft 15 and the corresponding two engaging holes 21a maintain the positional relationship shown in FIG. 6, since the torque of the clutch member 21 is not transferred to the rotary input shaft 7 via each engageable roller 29, the rotary input shaft 7 does not rotate, and the rotary shaft M1 of the AF motor M does not rotate.

On the other hand, in the case where each engageable roller 29 firmly wedges between one of the radially-narrowed circumferentially opposite ends of the associated circumferentially-uneven-depth groove 7c2 and the inner tapered surface 21c of the clutch member 21 (e.g., immediately after an AF operation), the relative rotational torque becomes larger than the predetermined torque when the rotary output shaft 15 is rotated. Consequently, each radial projection 15g moves in the associated engaging hole 21a rearward along the oblique edge 21a1 thereof against the biasing force of the compression coil spring 23 as shown in FIG. 7 to thereby move the clutch member 21 forward against the biasing force of the compression coil spring 23, the aforementioned wedging force which occurs between the outer tapered surface 29a of each engageable roller 29 and the inner tapered surface 21c of the clutch member 21 decreases. Therefore, even if a rotation of the rotary output shaft 15 causes the clutch member 21 to rotate, each engageable roller 29 (and the retainer 25 and each differential ball 27) does not transfer the torque of the clutch member 21 to the rotary input shaft 7, so that the rotary shaft M1 of the AF motor M does not rotate (no load is imposed on the AF motor M) even if the manual focus ring 108 is rotated.

As described above, according to the above illustrated embodiment of the lens barrel 100, an autofocusing operation can be performed by switching the AF switch ON. Moreover, even if the manual focus ring 108 is manually rotated with the AF switch remained ON, no torque of the manual focus ring 108 is transferred to the rotary shaft M1 of the AF motor M, so that the rotary shaft M1 does not apply any resistance to rotation of the manual focus ring 108, which makes a smooth manual focusing operation possible even if the AF switch is not switched from ON to OFF.

Furthermore, the one-way rotational transfer mechanism U1, wherein the rotary output shaft 15 rotates when the rotary input shaft 7 is rotated and wherein the rotary input shaft 7 does not rotate when the rotary output shaft 15 is rotated, is simple in structure.

Although each engageable roller 29 firmly wedges between the clutch member 21 and the rotary input shaft 7 if a torque is given to the rotary input shaft 7 to rotate the rotary output shaft 15 so as to bring the lens barrel 100 into focus, the manual focus ring 108 which operates in association with the clutch member 21 can be rotated smoothly even after an autofocusing operation is performed because the wedging force which occurs between the outer tapered surface 29a of each engageable roller 29 and the inner tapered surface 21c of the clutch member 21 decreases if the manual focus ring 108 is subsequently rotated.

Additionally, a torque of the rotary input shaft 7 can be securely transmitted to the clutch member 21 (the rotary output shaft 15) because each differential ball 27 is made to revolve (rotate) around the rotary input shaft 7 in the same direction as the rotating direction of the rotary input shaft 7 while trailing behind the rotation of the rotary input shaft 7, and because each engageable roller 29 is subsequently made to wedge firmly between the rotary input shaft 7 and the clutch member 21 to serve as a torque transfer member. Consequently, an autofocusing operation can be performed with reliability.

Moreover, since each engageable roller 29, which serves as a torque transfer member, is formed in a truncated conical shape that is truncated at its front end along a plane orthogonal to the axis C1 of the engageable roller 29, each engageable roller 29 is in contact with each of the rotary input shaft 7 and the clutch member 21 on a contact area greater than that in the case where the torque transfer member is spherical in shape. Therefore, the efficiency of transferring torque from the rotary input shaft 7 to the clutch member 21 (the rotary output shaft 15) in the one-way rotational transfer mechanism U1 is higher than that in the case where each second torque transfer member is spherical in shape.

Each differential ball 27 can be replaced by a cylindrical differential roller (not shown), the axis of which extends in a radial direction of the rotary input shaft 7 in a manner so that each cylindrical differential roller is fitted in the associated engaging holes 25c to be freely rotatable therein with an outer peripheral surface of the cylindrical differential roller contacting with the axially-orthogonal surface 7c1 of the rotary input shaft 7 and the pressing surface 17a of the annular member 17. This modification improves the efficiency of transferring torque from the rotary input shaft 7 to the retainer 25.

Moreover, a large number of the engageable rollers 29 can be installed in the annular space RS since each engageable roller 29 is installed in the annular spacer RS with the use of the retainer 25. The efficiency of transferring torque from the rotary input shaft 7 to the rotary output shaft 15 can be improved by increasing the number of the engageable rollers 29.

Although the one-way rotational transfer mechanism U1 is provided with the six accommodation spaces S1 in which the six engageable rollers 29 are installed in the above illustrated embodiment, the one-way rotational transfer mechanism U1 can be provided with only one accommodation space S1 in which one engageable roller 29 is installed if the efficiency of transferring torque from the rotary input shaft 7 to the rotary output shaft 15 does not have to be taken into account. In addition, although the one-way rotational transfer mechanism U1 is provided with the three differential balls 27 in the above illustrated embodiment, the one-way rotational transfer mechanism U1 can be modified to use only one differential ball 27.

FIGS. 8 through 12 show a second embodiment of the lens barrel according to the present invention. Elements and portions of this embodiment of the lens barrel 200 which are similar to those of the first embodiment of the lens barrel 100 are designated by the same reference numerals, and detailed descriptions of such similar elements and portions are omitted from the following descriptions.

Figure 8:
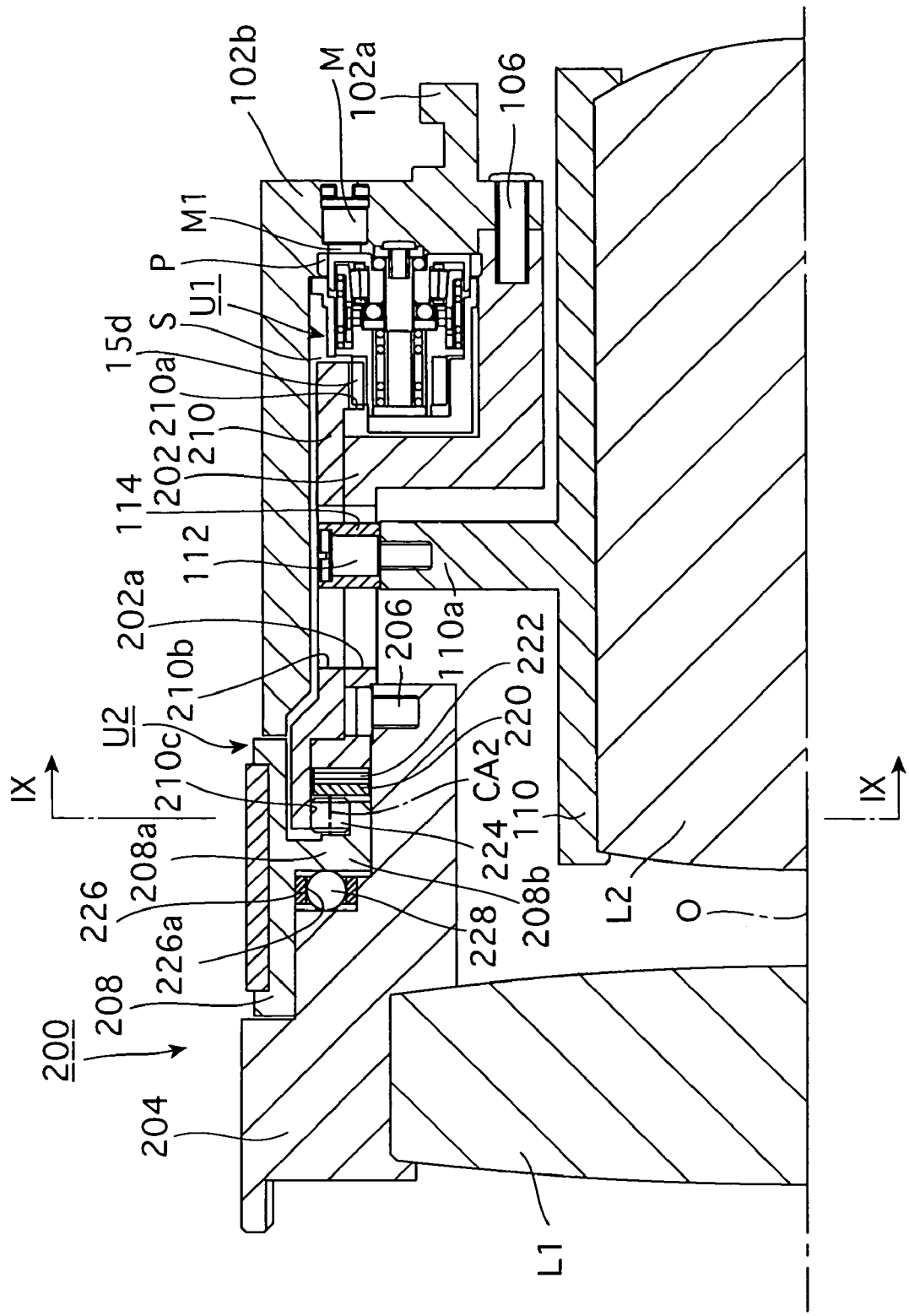
FIG. 8 is a longitudinal cross sectional view of an upper half of a second embodiment of a lens barrel from the optical axis thereof, according to the present invention.

The lens barrel 200 is provided with a second stationary ring 202 which corresponds to the second stationary ring 104 shown in FIG. 1. The second stationary ring 202 is provided, at equi-angular intervals in a circumferential direction of the second stationary ring 202, with a set of three linear guide slots 202a (which correspond to the set of three linear guide slots 104a of the second stationary ring 104 shown in FIG. 1). The second stationary ring 202 of the lens barrel 200 is smaller in length (in the optical axis direction) than the second stationary ring 104 shown in FIG. 1, and a rear end of the second stationary ring 202 is fixed to the rear end of the first stationary ring 102 by the set screws 106 (only one of them is shown in FIG. 8). The lens barrel 200 is provided between the first stationary ring 102 and the second stationary ring 202 with an accommodation space S which has an annular shape as viewed from the front thereof.

A lens holder ring 204 which holds the stationary lens group L1 is fixed at its rear end to an inner peripheral surface of the second stationary ring 202 at a front end thereof by set screws (only one of them is shown in FIG. 8) 206.

The lens barrel 200 is provided, in an annular space formed between a front end portion of the first stationary ring 102 and the lens holder ring 204, with a manual focus ring (hand-operated ring) 208 which is concentrically provided with the first stationary ring 102 to be freely rotatable about the optical axis O and to be immovable in the optical axis direction. The lens barrel 200 is provided in the accommodation space S with a distance adjustment ring 210 which is positioned to be freely rotatable about the optical axis O and to be immovable in the optical axis direction.

The distance adjustment ring 210 is provided, circumferentially on the inner peripheral surface of a rear end of the distance adjustment ring 210, with an input gear 210a which is in mesh with the output gear 15d of the one-way rotational transfer mechanism U1. The distance adjustment ring 210 is provided at equi-angular intervals in a circumferential direction thereof with a set of three cam grooves 210b in which the three rollers 114 are engaged, respectively. An inner peripheral surface (torque transfer cylindrical surface) 210c of the distance adjustment ring 210 in the vicinity of the front end thereof is formed in a circular shape as viewed from front thereof having a central axis coincident with the optical axis O.

The manual focus ring 208 is provided on an inner peripheral surface thereof with an annular wall 208a which projects radially inwards from the inner peripheral surface of the manual focus ring 208. The manual focus ring 208 is further provided at the inner edge of the annular wall 208a with an annular projection (annular overlapping portion) 208b which projects rearward from the inner edge of the annular wall 208a.

Figure 9:
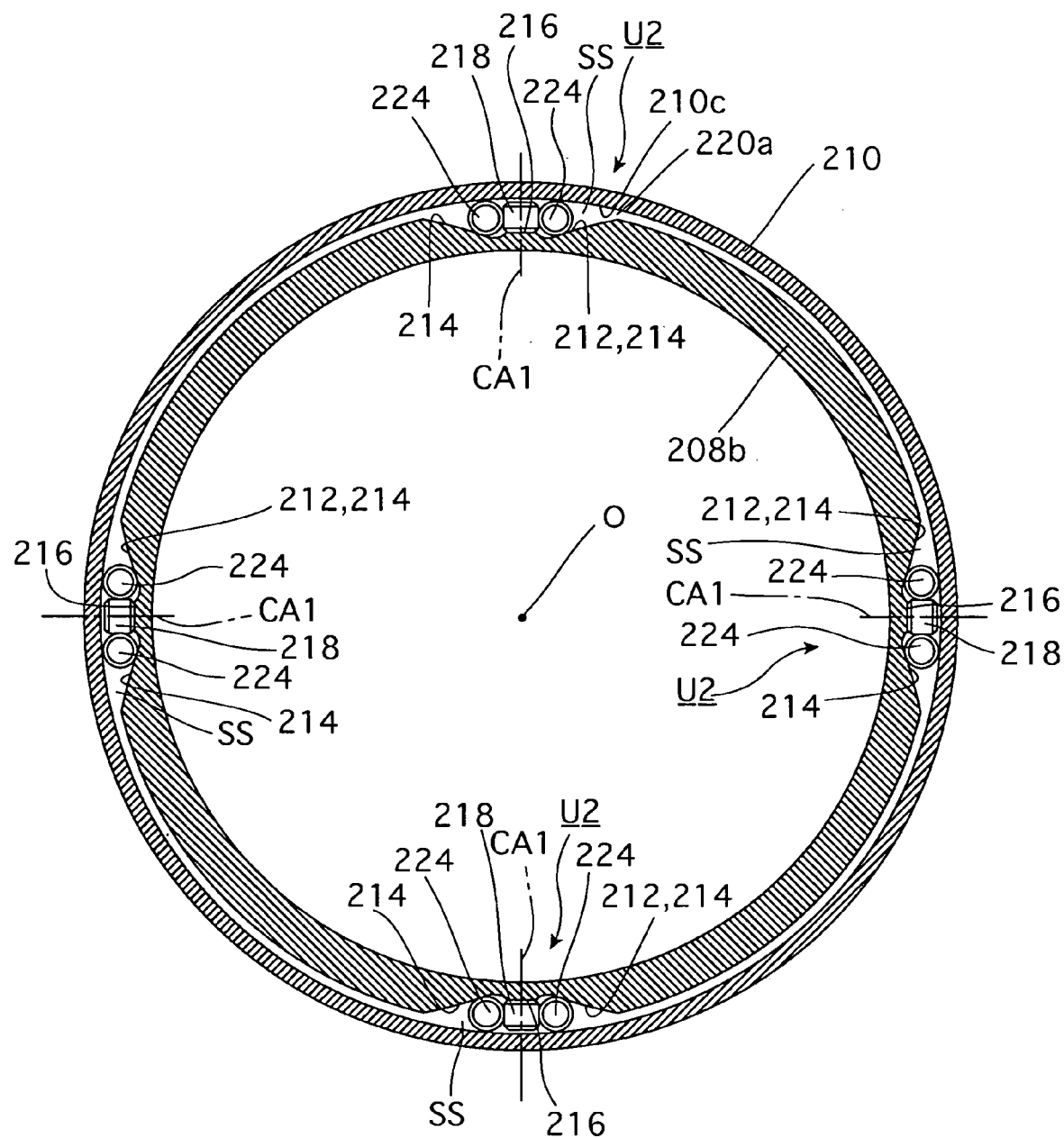
FIG. 9 is a cross sectional view taken along IX—IX line in FIG. 8, in which a lens holder ring, a movable ring and a focusing lens group are not shown.
Figure 10:
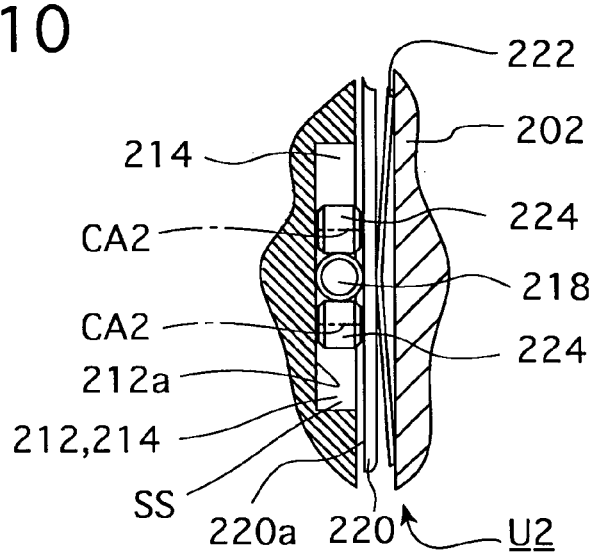
FIG. 10 is a sectional view of a portion of a second one-way rotational transfer mechanism incorporated in the lens barrel shown in FIG. 8, viewed from the outside of an annular projecting portion of a manual focus ring.
Figure 11:
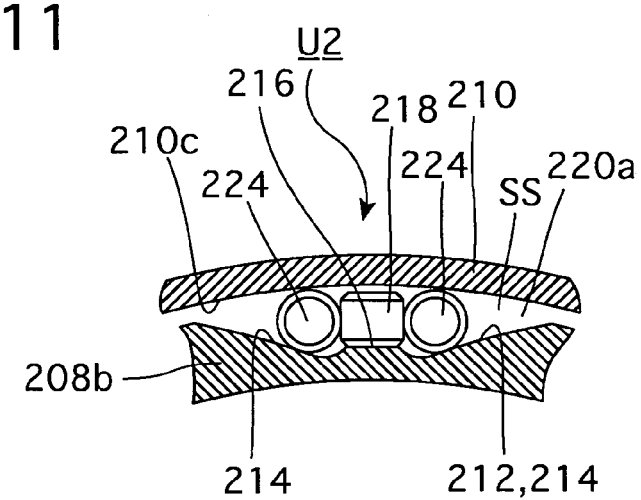
FIG. 11 is a cross sectional view of a portion of the second one-way rotational transfer mechanism.
Figure 12:
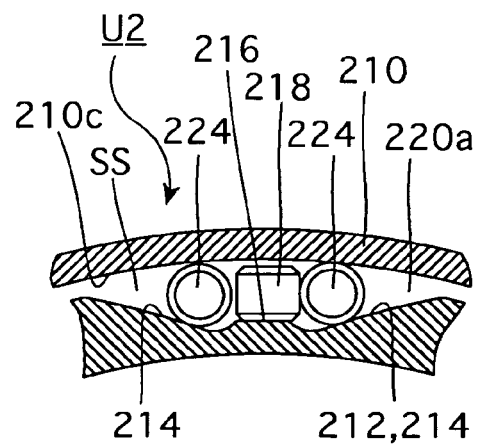
FIG. 12 is a view similar to that of FIG. 11, showing the same portion of the second one-way rotational transfer mechanism when the manual focus ring is rotated.

As shown in FIG. 9, the annular projection 208b of the manual focus ring 208 is provided on an outer peripheral surface thereof at equi-angular intervals in a circumferential direction with a set of four accommodation recesses 212 which are recessed radially inwards. Each accommodation recess 212 is formed by a pair of circumferentially-uneven-depth grooves (second circumferentially-uneven-width-space forming portions/second uneven-depth grooves) 214, each of which has different radial depths at different circumferential positions, and a flat portion (second circumferentially-uneven-width-space forming portion) 216 formed between each pair of circumferentially-uneven-depth grooves 214. As shown in FIG. 10, an inner front surface in each accommodation recess 212 is formed as an axially-orthogonal surface (second orthogonal surface) 212a which lies in a plane orthogonal to the optical axis O. An accommodation space (circumferentially-uneven-width space) SS having different shapes at different circumferential positions is formed between the inner peripheral surface 210c of the distance adjustment ring 210 and each accommodation recess 212 (which is formed by one pair of circumferentially-uneven-depth grooves 214 and the associated flat portion 216).

As shown in FIGS. 9 through 12, a differential roller (second differential rotating member) 218 is installed between each flat portion 216 and the inner peripheral surface 210c of the distance adjustment ring 210 so that an axis (axis of rotation) CA1 of the differential roller 218 extends in a radial direction of the manual focus ring 208. As shown in FIG. 10, an annular flat member (second pressing member) 220 which is seen as a ring shape as viewed from the front thereof is fitted on a rear portion of the lens holder ring 204 and positioned in an annular space between a front end surface of the second stationary ring 202 and a rear end of the annular projection 208b, while an annular leaf spring (third biasing device) 222 which has a ring shape as viewed from the front thereof is fitted on the rear portion of the lens holder ring 204 and positioned in the aforementioned annular space between the annular flat member 220 and the front end surface of the second stationary ring 202. The annular leaf spring 222 continuously biases the annular flat member 220 forward so that a pressing surface (second pressing surface) 220a (which is parallel to the axially-orthogonal surface 212a) on the front of the annular flat member 220 remains in pressing contact with a rear surface of each differential roller 218 to bias each differential roller 218 forward, thus causing a front surface of each differential roller 218 to be continuously pressed against the axially-orthogonal surface 212a of the associated accommodation recess 212.

Additionally, a pair of engageable rollers (second torque transfer members) 224 are installed in each accommodation recess 212 (each accommodation space SS) on opposite sides of the associated differential roller 218 in a manner so as to hold the differential roller 218 between the pair of engageable rollers 224 and so that an axis CA2 of each engageable roller 224 extends in a direction parallel to the optical axis O. The peripheral surface of each engageable roller 224 is freely rotatable while being in contact with the associated circumferentially-uneven-depth groove 214 and the inner peripheral surface 210c of the distance adjustment ring 210.

As shown in FIG. 8, the lens barrel 200 is provided, in an annular space (which has a ring shape as viewed from the front of the lens barrel 200) formed between the lens holder ring 204 and the annular wall 208a of the manual focus ring 208, with a ball retaining ring 226 so that the ball retaining ring 226 is freely rotatable about the optical axis O. The ball retaining ring 226 is provided at equi-angular intervals in a circumferential direction with a plurality of insertion holes 226a (only one of them is shown in FIG. 8). A ball 228 (like that of a ball bearing) is installed in each insertion hole 226a to be freely rotatable therein while remaining in contact with a front surface of the annular wall 208a and the lens holder ring 204.

The annular projection 208b of the manual focus ring 208, the inner peripheral surface 210c of the distance adjustment ring 210, the four accommodation recesses 212 (the axially-orthogonal surface 212a, the four pairs of circumferentially-uneven-depth grooves 214 and the four flat portions 216), the differential rollers 218, the annular flat member 220, the annular leaf spring 222 and the four pairs of engageable rollers 224 are elements which constitute a one-way rotational transfer mechanism (second one-way rotational transfer mechanism) U2.

The lens barrel 200 is provided with an AF switch (not shown) for enabling or disabling AF photography (i.e. for switching between AF mode and MF mode).

Operations of the lens barrel 200, having the above described structure, when a focusing operation is performed in autofocus mode will be hereinafter discussed.

In this case, firstly the aforementioned AF switch is switched ON to select AF mode, in which an autofocusing operation can be performed. Immediately after a control circuit (not shown) provided in the camera body outputs a forward-rotation drive signal to the AF motor M to rotate the AF motor M in a forward direction, a forward rotation of the AF motor M is transferred to the rotary input shaft 7 via the engagement of the pinion P with the input gear 7g so that the rotary output shaft 15 rotates counterclockwise similar to the first embodiment of the lens barrel 100. This rotation of the rotary output shaft 15 is transferred to the input gear 210a via the output gear 15d to rotate the distance adjustment ring 210 counterclockwise as viewed from the front thereof. Consequently, the focusing lens group L2 moves forward along the optical axis O.

At this time, even if the distance adjustment ring 210 rotates in such a manner, a torque of the distance adjustment ring 210 is not transferred to any of the engageable rollers 218, thus not causing any engageable roller 224 to rotate in a circumferential direction of the distance adjustment ring 210 (see FIG. 11), since the inner peripheral surface 210c of the distance adjustment ring 210 has a circular shape as viewed from the front thereof. Accordingly, the manual focus ring 208 does not rotate even if the distance adjustment ring 210 rotates.

On the other hand, if the control circuit in the camera body outputs a reverse-rotation drive signal to the AF motor M to rotate the AF motor M in the reverse direction, a reverse rotation of the AF motor M is transferred to the rotary input shaft 7 via the engagement of the pinion P with the input gear 7g so that the rotary output shaft 15 rotates clockwise similar to the first embodiment of the lens barrel 100. This rotation of the rotary output shaft 15 is transferred to the input gear 210a via the output gear 15d to rotate the distance adjustment ring 210 clockwise as viewed from the front thereof. Consequently, the focusing lens group L2 moves rearward along the optical axis O.

At this time, similar to the case where the AF motor M rotates in forward direction, a torque of the distance adjustment ring 210 is not transferred to any of the engageable rollers 218 even if the distance adjustment ring 210 rotates, thus not causing any engageable roller 224 to rotate in a circumferential direction of the distance adjustment ring 210. Accordingly, the manual focus ring 208 does not rotate even if the distance adjustment ring 210 rotates.

In this manner the control circuit makes the AF motor M rotate in forward and reverse directions to move the focusing lens group L2 forward and rearward to perform an autofocusing operation.

Operations of the lens barrel 200 when a focusing operation is performed in the manual focus mode will be hereinafter discussed.

If the manual focus ring 208 is manually rotated by the user counterclockwise as viewed from the front of the lens barrel 200 with the AF switch remained ON without actuating the AF motor M, each differential roller 218, which is held between the pressing surface 220a of the annular flat member 220 and the axially-orthogonal surface 212a of the manual focus ring 208, revolves about the optical axis O in the same direction (counterclockwise direction) as the rotating direction of the manual focus ring 208 while rotating on the axis CA1 of the differential roller 218 in the associated accommodation recess 212. During this movement of each differential roller 218, provided that no slip occurs either between each differential roller 218 and the pressing surface 220a or between each differential roller 218 and the axially-orthogonal surface 212a, the revolving speed of each differential roller 218 about the optical axis O is half the rotational speed of the manual focus ring 208. As a result, each differential roller 218 revolves clockwise as viewed from the front thereof relative to the manual focus ring 208 (see FIG. 12). Therefore, each differential roller 218 comes in contact with one of the associated pair of engageable rollers 224 which is positioned on the clockwise side as viewed from the front thereof, and subsequently biases this engageable roller 224 so that it rotates clockwise. This engageable roller 224 rotates clockwise in the associated accommodation space SS to firmly wedge into one of the wedge-shape (radially-narrowed) circumferentially opposite ends of the associated accommodation space SS which is positioned on the clockwise side in the accommodation space SS between the associated circumferentially-uneven-depth groove 214 and the inner peripheral surface 210c of the distance adjustment ring 210. This causes the manual focus ring 208 and the distance adjustment ring 210 to become integral with each other circumferentially (i.e., in a state so as to rotate together) via the wedged engageable rollers 224 so that the rotation of the manual focus ring 208 is transferred to the distance adjustment ring 210 to rotate the distance adjustment ring 210 counterclockwise. Thereupon, this counterclockwise rotation of the distance adjustment ring 210 causes the focusing lens group L2 to move forward along the optical axis O.

When the distance adjustment ring 210 rotates counterclockwise in such a manner, this rotation of the distance adjustment ring 210 is transferred to the output gear 15d of the one-way rotational transfer mechanism U1, but the rotary shaft M1 of the AF motor M does not rotate because the one-way rotational transfer mechanism U1 does not transfer this rotation of the distance adjustment ring 210 to the AF motor M similarly to the first embodiment of the lens barrel 100.

On the other hand, if the manual focus ring 208 is manually rotated by the user clockwise as viewed from the front of the lens barrel 200, each differential roller 218, which is held between the pressing surface 220a of the annular flat member 220 and the axially-orthogonal surface 212a of the manual focus ring 208, revolves about the optical axis O in the same direction (clockwise direction) as the rotating direction of the manual focus ring 208 while rotating about the axis CA1 of the differential roller 218 in the associated accommodation recess 212. During this movement of each differential roller 218, provided that no slip occurs either between each differential roller 218 and the pressing surface 220a or between each differential roller 218 and the axially-orthogonal surface 212a, the revolving speed of each differential roller 218 about the optical axis O is half the rotational speed of the manual focus ring 208. As a result, each differential roller 218 revolves counterclockwise as viewed from the front thereof relative to the manual focus ring 208. Therefore, each differential roller 218 comes in contact with one of the associated pair of engageable rollers 224 which is positioned on the counterclockwise side as viewed from the front thereof, and subsequently biases this engageable roller 224 so that it rotates counterclockwise. This engageable roller 224 rotates counterclockwise in the associated accommodation space SS to firmly wedge into the other of the wedge-shape (radially-narrowed) circumferentially opposite ends of the associated accommodation space SS, which is positioned on the counterclockwise side in the accommodation space SS between the associated circumferentially-uneven-depth groove 214 and the inner peripheral surface 210c of the distance adjustment ring 210. This causes the manual focus ring 208 and the distance adjustment ring 210 to become integral with each other circumferentially (i.e., in a state so as to rotate together) via the wedged engageable rollers 224 so that the rotation of the manual focus ring 208 is transferred to the distance adjustment ring 210 to rotate the distance adjustment ring 210 clockwise. Thereupon, this clockwise rotation of the distance adjustment ring 210 causes the focusing lens group L2 to move rearward along the optical axis O.

When the distance adjustment ring 210 rotates clockwise in such a manner, this rotation of the distance adjustment ring 210 is transferred to the output gear 15d of the one-way rotational transfer mechanism U1, but the rotary shaft M1 of the AF motor M does not rotate because the one-way rotational transfer mechanism U1 does not transfer this rotation of the distance adjustment ring 210 to the AF motor M.

As has been described above, according to the above illustrated second embodiment of the lens barrel 200, not only effects similar to those obtained in the first embodiment of the lens barrel 100 are obtained, also the autofocusing operation is performed smoothly since the manual focus ring 208 does not rotate during the autofocusing operation even if the user touches the manual focus ring 208, which is an effect that is not obtained in the first embodiment of the lens barrel 100.

Each of the first and second embodiments of the lens barrels can be modified in the following manner. For instance, the efficiency of transferring torque transferred from the rotary input shaft 7 to the rotary output shaft 15 can be changed by changing the following factors: internal angles of the wedge-shaped opposite end portions that are formed between the clutch member 21 and each circumferentially-uneven-depth groove 7c2, the spring force of the compression coil spring 19, the surface friction of the axially-orthogonal surface 7c1, and the surface friction of the pressing surface 17a of the annular member 17.

It is possible that the clutch member 21 be provided with one or more radial projections which are engaged in one or more engaging holes formed on the rotary output shaft 15.

In addition, the first one-way rotational transfer mechanism U2 can be modified so that the annular projection 208b is formed on the manual focus ring 208 to be positioned radially outside the front end portion of the distance adjustment ring 210, so that the set of accommodation recesses 212 are formed on an inner peripheral surface of the annular projection of the manual focus ring 208, an outer peripheral surface of a front portion of the distance adjustment ring 210 is formed as a torque transfer cylindrical surface corresponding to the inner peripheral surface 210c, a set of second circumferentially-uneven-width spaces corresponding to the set of accommodation spaces SS are formed between the torque transfer cylindrical surface and each pair of circumferentially-uneven-depth grooves 214 and the associated flat portion 216, and one differential roller 218 and the corresponding pair of engageable rollers 224 are installed between each accommodation recess and the torque transfer cylindrical surface, respectively.

Although the one-way rotational transfer mechanism U1 is applied to a focusing mechanism in the first and second embodiments of the lens barrel 100, the one-way rotational transfer mechanism U1 can be applied to a zooming mechanism of a zoom lens barrel. Namely, each of the lens barrels 100 and 200 can be modified so that a distance adjustment ring for moving a movable ring which holds at least one zoom lens group along an optical axis is manually rotated by a zoom ring (hand-operated ring) when a power zoom switch is OFF, so that the distance adjustment ring is driven to rotate by a zoom motor (motor) in association with rotation of the zoom ring when the power zoom switch is ON, and so that the one-way rotational transfer mechanism U1 is positioned between the zoom motor and the distance adjustment ring.

If the lens barrel 100 or 200 is modified in this manner, the distance adjustment ring rotates by a driving force of the zoom motor to perform a zooming operation if the zoom ring is rotated with the power zoom switch ON. On the other hand, a manual zooming operation is performed if the zoom ring is manually rotated with the power zoom switch OFF. However, when the power zoom switch is OFF, the one-way rotational transfer mechanism U1 does not transfer any torque from the distance adjustment ring rotated by the rotation of the zoom ring to the zoom motor. Accordingly, the zoom motor does not apply any resistance to rotation of the zoom ring, which makes a smooth manual zooming operation possible.

According to the present invention, a one-way rotational transfer mechanism can be achieved, which is simple in structure, capable of transferring a torque from the rotary input shaft to the rotary output shaft smoothly and reliably, capable of transferring a greater torque from the rotary input shaft to the rotary output shaft, and capable of making the rotary output shaft rotate smoothly upon a torque being applied thereto after the rotary output shaft is rotated upon application of a torque to the rotary output shaft.

According to the present invention, in a lens barrel can be provided, in which a movable lens group is moved along an optical axis selectively by one of a driving force of a motor and a torque of a hand-operated ring, the driving force of the motor can be securely transferred to the movable lens group to move the movable lens group when the motor is driven to rotate, and the movable lens group can be moved smoothly by a driving force of the hand-operated ring after the movable lens group is moved by a driving force of the motor.

Obvious changes may be made in the specific embodiments of the present invention described herein, such modifications being within the spirit and scope of the invention claimed. It is indicated that all matter contained herein is illustrative and does not limit the scope of the present invention.

The invention claimed is:

1. A one-way rotational transfer mechanism comprising:
a rotary input shaft having an orthogonal surface lying on a plane orthogonal to an axis of said rotary input shaft;
a rotary output shaft freely rotatable relative to said rotary input shaft about said axis thereof;
a clutch member concentrically positioned around said rotary output shaft, said clutch member capable of moving along said axis of said rotary input shaft relative to said rotary output shaft, an inner peripheral surface of said clutch member serving as an inner-peripheral contacting surface;
at least one differential rotating member positioned on a circle centered on said axis of said rotary input shaft, said differential rotating member revolving about said axis of said rotary input shaft in a same direction as a rotation of said rotary input shaft at a slower speed than said rotation of said rotary input shaft in association with said rotation of said rotary input shaft;
a first biasing device which presses said differential rotating member against said orthogonal surface;
a circumferentially-uneven-width-space forming portion formed on an outer peripheral surface of said rotary input shaft to form at least one accommodation space between said outer peripheral surface of said rotary input shaft and said inner-peripheral contacting surface of said clutch member, said accommodation space having different radial widths at different circumferential positions;
at least one torque transfer member installed in said accommodation space to be freely movable therein and revolving about said axis of said rotary input shaft in a same direction as said differential rotating member in association with said differential rotating member, said torque transfer member having a circular cross-section contacting surface capable of contacting with said inner-peripheral contacting surface of said clutch member;

a second biasing device which biases said clutch member in a direction to increase friction between said inner-peripheral contacting surface of said clutch member and said circular cross-section contacting surface of said torque transfer member to prevent said clutch member from moving relative to said rotary output shaft; and an associating device for transferring a torque produced by one of said clutch member and said rotary output shaft to the other of said clutch member and said rotary output shaft, wherein said circumferentially-uneven-width-space forming portion is shaped to make said torque transfer member, which revolves about said axis of said rotary input shaft in association with said rotary input shaft and said differential rotating member, wedge between said circumferentially-uneven-width-space forming portion and said clutch member while making said circular cross-section contacting surface of said torque transfer member contact said inner-peripheral contacting surface so that said rotary input shaft and said clutch member become integral with each other circumferentially when said rotary input shaft is rotated, and wherein said associating device operates to make said clutch member, which becomes integral with said rotary input shaft, circumferentially transfer a torque of said clutch member to said rotary output shaft when said rotary input shaft is rotated, and operates to cause friction-decreasing relative movement between said clutch member and said rotary output shaft in a direction to decrease said friction against a biasing force of said second biasing device to release the state of integral engagement of said rotary input shaft with said clutch member when said rotary output shaft is rotated so that a relative rotational torque, which is defined as a difference between a rotational torque of said rotary output shaft and a rotational torque of said rotary input shaft, is greater than a predetermined torque determined by a shape of said associating device.

2. The one-way rotational transfer mechanism according to claim 1, wherein said associating device prevents said friction-decreasing relative movement between said clutch member and said rotary output shaft when said relative rotational torque, upon said rotary input shaft being rotated, is smaller than or equal to said predetermined torque, and wherein, when said relative rotational torque becomes larger than said predetermined torque, said associating device temporarily allows said friction-decreasing relative movement between said clutch member and said rotary output shaft, and subsequently allows said clutch member to return to an initial position thereof by said biasing force of said second biasing device to hold said clutch member at said initial position thereof.

3. The one-way rotational transfer mechanism according to claim 1, wherein in the case where said relative rotational torque is smaller than or equal to said predetermined torque, upon said rotary output shaft being rotated, said associating device does not allow said friction-decreasing relative movement between said clutch member and said rotary output shaft.

4. The one-way rotational transfer mechanism according to claim 1, wherein an annular space including said accommodation space is formed between said rotary input shaft and said clutch member, and wherein said one-way rotational transfer mechanism further comprises a retainer having a ring shape which is installed in said annular space to hold said torque transfer member, said retainer rotating in a same direction as said revolving direction of said differential rotating member upon receiving a revolving force of said differential rotating member when said differential rotating member revolves about said axis of said rotary input shaft.

5. The one-way rotational transfer mechanism according to claim 1, further comprising a pressing member having a pressing surface which faces said orthogonal surface of said rotary input shaft to be parallel thereto, wherein said pressing member is biased toward said orthogonal surface by said first biasing device to hold said differential rotating member between said pressing surface and said orthogonal surface.

6. The one-way rotational transfer mechanism according to claim 1, wherein said associating device comprises:

at least one power transmission pin formed on one of said clutch member and said rotary input shaft; and at least one power transmission hole formed on the other of said clutch member and said rotary input shaft so that said power transmission pin is loosely fitted in said power transmission hole.

7. The one-way rotational transfer mechanism according to claim 6, wherein said predetermined torque is determined by a shape of said power transmission hole and by a shape of said power transmission pin.

8. The one-way rotational transfer mechanism according to claim 1, wherein said inner-peripheral contacting surface of said clutch member is formed as a first tapered surface, and wherein said circular cross-section contacting surface is formed as a second tapered surface which tapers in a substantially same direction as said first tapered surface.

9. The one-way rotational transfer mechanism according to claim 1, wherein said torque transfer member is formed in a truncated conical shape.

10. The one-way rotational transfer mechanism according to claim 1, wherein said differential rotating member is formed as a substantially cylindrical-shaped roller an axis of which extends in a radial direction of said rotary input shaft.

11. The one-way rotational transfer mechanism according to claim 1, wherein said differential rotating member is spherical in shape.

12. The one-way rotational transfer mechanism according to claim 1, wherein said accommodation space formed by said circumferentially-uneven-width-space forming portion comprises a plurality of accommodation spaces between said outer peripheral surface of said rotary input shaft and said inner-peripheral contacting surface of said clutch member, and wherein said torque transfer member comprises a plurality of torque transfer members which are installed in said plurality of accommodation spaces, respectively.

13. The one-way rotational transfer mechanism according to claim 1, wherein said circumferentially-uneven-width-space forming portion comprises at least one circumferentially-uneven-depth groove which is elongated in a longitudinal direction of said rotary input shaft and which has different radial depths at different circumferential positions.

14. The one-way rotational transfer mechanism according to claim 1, wherein said rotary input shaft comprises an input gear which is in mesh with a pinion of a motor.

15. The one-way rotational transfer mechanism according to claim 1, wherein said rotary input shaft, said rotary output shaft and said clutch member are concentrically positioned with one another.

16. The one-way rotational transfer mechanism according to claim 4, wherein said differential rotating member comprises a plurality of differential rotating members, and
wherein said retainer comprises a plurality of engaging holes in which said plurality of differential rotating members are installed.

17. The one-way rotational transfer mechanism according to claim 4, wherein said torque transfer member comprises a plurality of torque transfer members, and
wherein said retainer comprises a plurality of insertion holes in which said plurality of torque transfer members are installed, respectively.

18. The one-way rotational transfer mechanism according to claim 1, wherein said first biasing device comprises a compression coil spring.

19. The one-way rotational transfer mechanism according to claim 1, wherein said second biasing device comprises a compression coil spring.

20. The one-way rotational transfer mechanism according to claim 6, wherein said power transmission hole comprises two power transmission holes arranged at intervals of 180 degrees in a circumferential direction of said one of said clutch member and said rotary input shaft, and
wherein said power transmission pin comprises two power transmission pins which are loosely fitted in said two power transmission holes, respectively.

21. A lens barrel comprising:
a hand-operated ring which moves a movable lens group along an optical axis thereof when manually rotated;
a motor for moving said movable lens group along said optical axis; and
a first one-way rotational transfer mechanism which transfers torque of said motor to said movable lens group when said motor is driven, and prevents a moving force of said movable lens group from being transferred to said motor when said hand-operated ring is manually rotated;
wherein said first one-way rotational transfer mechanism comprises:
a rotary input shaft driven to rotate by said motor, said rotary input shaft including a first orthogonal surface lying on a plane orthogonal to an axis of said rotary input shaft which is parallel to said optical axis;
a rotary output shaft freely rotatable relative to said rotary input shaft, wherein rotation of said rotary output shaft and a movement of said movable lens group along said optical axis are associated with each other;
a clutch member concentrically positioned around said rotary output shaft, said clutch member capable of moving along said axis of said rotary input shaft relative to said rotary output shaft, an inner peripheral surface of said clutch member serving as an inner-peripheral contacting surface;
at least one first differential rotating member positioned on a circle centered on said axis of said rotary input shaft, said differential rotating member revolving about said axis of said rotary input shaft in a same direction as a rotation of said rotary input shaft at a slower speed than said rotation of said rotary input shaft in association with said rotation of said rotary input shaft;
a first biasing device which presses said first differential rotating member against said first orthogonal surface;
a first circumferentially-uneven-width-space forming portion formed on an outer peripheral surface of said rotary input shaft to form at least one first accommodation space between said outer peripheral surface of said rotary input shaft and said inner-peripheral contacting surface of said clutch member, said first accommodation space having different radial widths at different circumferential positions;
at least one first torque transfer member installed in said first accommodation space to be freely movable therein, said first torque transfer member revolving about said axis of said rotary input shaft in a same direction as a rotational direction of said first differential rotating member in association with said first differential rotating member, and having a circular cross-section contacting surface capable of contacting said inner-peripheral contacting surface of said clutch member;
a second biasing device which biases said clutch member in a direction to increase friction between said inner-peripheral contacting surface of said clutch member and said circular cross-section contacting surface of said first torque transfer member to prevent said clutch member from moving relative to said rotary output shaft; and
an associating device for transferring a torque produced by one of said clutch member and said rotary output shaft to the other of said clutch member and said rotary output shaft,
wherein said first circumferentially-uneven-width-space forming portion is shaped to make said first torque transfer member, which revolves about said axis of said rotary input shaft in association with said rotary input shaft and said first differential rotating member, wedge between said first circumferentially-uneven-width-space forming portion and said clutch member while making said circular cross-section contacting surface of said torque transfer member contact said inner-peripheral contacting surface so that said rotary input shaft and said clutch member become integral with each other circumferentially when said rotary input shaft is rotated, and
wherein said associating device operates to make said clutch member, which becomes integral with said rotary input shaft, circumferentially transfer a torque of said clutch member to said rotary output shaft when said rotary input shaft is rotated, and operates to cause friction-decreasing relative movement between said clutch member and said rotary output shaft in a direction to decrease said friction against a biasing force of said second biasing device to release the state of integral engagement of said rotary input shaft with said clutch member when said rotary output shaft is rotated so that a relative rotational torque, which is defined as a difference between a rotational torque of said rotary output shaft and a rotational torque of said rotary input shaft, is greater than a predetermined torque determined by a shape of said associating device.

22. The lens barrel according to claim 21, wherein said associating device prevents said friction-decreasing relative movement between said clutch member and said rotary output shaft when said relative rotational torque, upon said rotary input shaft being rotated, is smaller than or equal to said predetermined torque, and wherein, when said relative rotational torque becomes larger than said predetermined torque, said associating device temporarily allows said friction-decreasing relative movement between said clutch member and said rotary output shaft, and subsequently allows said clutch member to return to an initial position thereof by said biasing force of said second biasing device to hold said clutch member at said initial position thereof.

23. The lens barrel according to claim 21, wherein in the case where said relative rotational torque is smaller than or equal to said predetermined torque, upon said rotary output shaft being rotated, said associating device does not allow said friction-decreasing relative movement between said clutch member and said rotary output shaft.

24. The lens barrel according to claim 21, wherein an annular space including said first accommodation space is formed between said rotary input shaft and said clutch member, and
wherein said one-way rotational transfer mechanism further comprises a retainer having a ring shape which is installed in said first annular space to hold said first torque transfer member, said retainer rotating in a same direction as a rotational direction of said first differential rotating member upon receiving a revolving force of said first differential rotating member when said first differential rotating member revolves about said axis of said rotary input shaft.

25. The lens barrel according to claim 21, further comprising a first pressing member having a pressing surface which faces said first orthogonal surface of said rotary input shaft to be parallel thereto,
wherein said first pressing member is biased toward said first orthogonal surface by said first biasing device to hold said first differential rotating member between said first pressing surface and said first orthogonal surface.

26. The lens barrel according to claim 21, wherein said associating device comprises:
at least one power transmission pin formed on one of said clutch member and said rotary input shaft; and
at least one power transmission hole formed on the other of said clutch member and said rotary input shaft so that said power transmission pin is loosely fitted in said power transmission hole.

27. The lens barrel according to claim 26, wherein said predetermined torque is determined by a shape of said power transmission hole and by a shape of said power transmission pin.

28. The lens barrel according to claim 21, wherein said inner-peripheral contacting surface of said clutch member is formed as a first tapered surface, and
wherein said circular cross-section contacting surface is formed as a second tapered surface which tapers in a substantially same direction as said first tapered surface.

29. The lens barrel according to claim 21, wherein said torque transfer member is formed in a truncated conical shape.

30. The lens barrel according to claim 21, wherein said first differential rotating member is formed as a substantially cylindrical-shaped roller, an axis of which extends in a radial direction of said rotary input shaft.

31. The lens barrel according to claim 21, wherein said first differential rotating member is spherical in shape.

32. The lens barrel according to claim 21, wherein said first accommodation space formed by said first circumferentially-uneven-width-space forming portion comprises a plurality of first accommodation spaces between said outer peripheral surface of said rotary input shaft and said inner-peripheral contacting surface of said clutch member, and
wherein said first torque transfer member comprises a plurality of first torque transfer members which are installed in said plurality of first accommodation spaces, respectively.

33. The lens barrel according to claim 21, wherein said first circumferentially-uneven-width-space forming portion comprises at least one first circumferentially-uneven-depth groove which is elongated in a longitudinal direction of said rotary input shaft and which has different radial depths at different circumferential positions.

34. The lens barrel according to claim 21, further comprising:
a distance adjustment ring which moves said movable lens group along said optical axis by one of a torque of said hand-operated ring and a torque of said rotary output shaft; and
a second one-way rotational transfer mechanism which transfers said torque of said hand-operated ring to said distance adjustment ring, and prevents said torque of said distance adjustment ring from being transferred to said hand-operated ring, said second one-way rotational transfer mechanism being positioned between said distance adjustment ring and said hand-operated ring.

35. The lens barrel according to claim 34, wherein said second one-way rotational transfer mechanism comprises:
a second orthogonal surface formed on said hand-operated ring to lie in a plane orthogonal to said optical axis;
an annular overlapping portion formed on said hand-operated ring to overlap said distance adjustment ring in a radial direction of said lens barrel;
a torque transfer cylindrical surface formed on one of an inner peripheral surface and an outer peripheral surface of said distance adjustment ring to face said annular overlapping portion;
at least one second circumferentially-uneven-width-space forming portion formed on said annular overlapping portion to form at least one second accommodation space between said annular overlapping portion and said torque transfer cylindrical surface, said second accommodation space having different radial widths at different circumferential positions;
a second differential rotating member installed in said second accommodation space, and pressed against said second orthogonal surface by a third biasing device, said second differential rotating member revolving about said axis of said hand-operated ring in a same direction as a rotational direction of said hand-operated ring while revolving at a slower speed than said rotation of said hand-operated ring in association with said rotation of said hand-operated ring; and
at least one second torque transfer member installed in said second accommodation space, said second torque member revolving about said axis of said hand-operated ring in a same revolving direction as said second differential rotating member when pressed by said second differential rotating member,
wherein said second circumferentially-uneven-width-space forming portion is shaped so that said second torque transfer member, which revolves in a circumferential direction about said axis of said hand-operated ring, wedges between said second circumferentially-uneven-width-space forming portion and said torque transfer cylindrical surface to transfer said torque of said hand-operated ring to said distance adjustment ring when said hand-operated ring is manually rotated.

36. The lens barrel according to claim 35, wherein said second torque transfer member comprises a pair of second torque transfer members which are provided on opposite sides of said second differential rotating member in said circumferential direction in a manner so as to support said second differential rotating member.

37. The lens barrel according to claim 35, wherein at least a portion of said second circumferentially-uneven-width-space forming portion is formed by at least one second circumferentially-uneven-depth groove having different radial depths at different circumferential positions.

38. The lens barrel according to claim 35, further comprising a second pressing member having a second pressing surface which faces said second orthogonal surface to be parallel thereto,
wherein said second pressing member is biased toward said second orthogonal surface by said third biasing device to hold said second differential rotating member between said second pressing surface and said second orthogonal surface.

39. The lens barrel according to claim 35, wherein said second accommodation space comprises a plurality of second accommodation spaces formed between said annular overlapping portion and said torque transfer cylindrical surface, and
wherein said second differential rotating member and said second torque transfer member are installed in each of said plurality of second accommodation spaces.

40. The lens barrel according to claim 35, wherein said second torque transfer member is formed as a cylindrical member having an axis which is parallel to said axis of said hand-operated ring.

41. The lens barrel according to claim 21, wherein said movable lens group serves as a focusing lens group,
wherein said motor serves as an AF motor which moves said movable lens group along said optical axis to perform a focusing operation, and
wherein said hand-operated ring serves as a manual focus ring which is manually rotated to perform said focusing operation.

42. The lens barrel according to claim 21, wherein said movable lens group comprises an element of a zooming optical system of said lens barrel,
wherein said motor serves as a zoom motor which moves said movable lens group along said optical axis to perform said zooming operation, and
wherein said hand-operated ring serves as a zoom ring which is manually rotated to perform said zooming operation.

43. The lens barrel according to claim 21, wherein said rotary input shaft comprises an input gear which is in mesh with a pinion of a motor.

44. The lens barrel according to claim 21, wherein said rotary input shaft, said rotary output shaft and said clutch member are concentrically positioned with one another.

45. The lens barrel according to claim 24, wherein said second differential rotating member comprises a plurality of second differential rotating members, and
wherein said retainer comprises a plurality of engaging holes in which said plurality of second differential rotating members are installed.

46. The lens according to claim 25, wherein said first torque transfer member comprises a plurality of torque transfer members, and
wherein said retainer comprises a plurality of insertions holes in which said plurality of first torque transfer members are installed, respectively.

47. The lens barrel according to claim 21, wherein said first biasing device comprises a compression coil spring.

48. The lens barrel according to claim 21, wherein said second biasing device comprises a compression coil spring.

49. The lens barrel according to claim 35, wherein said third biasing device comprises an annular leaf spring.

* * * * *